(12) United States Patent
Asakura et al.

(10) Patent No.: US 10,328,948 B2
(45) Date of Patent: Jun. 25, 2019

(54) VEHICLE CONTROL SYSTEM, VEHICLE CONTROL METHOD AND VEHICLE CONTROL PROGRAM

(71) Applicant: HONDA MOTOR CO., LTD., Tokyo (JP)

(72) Inventors: Masahiko Asakura, Wako (JP); Kunimichi Hatano, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

(21) Appl. No.: 15/599,682

(22) Filed: May 19, 2017

(65) Prior Publication Data

US 2017/0334455 A1    Nov. 23, 2017

(30) Foreign Application Priority Data

May 20, 2016   (JP) .................................. 2016-101615

(51) Int. Cl.
| | | |
|---|---|---|
| *B60W 50/08* | (2012.01) | |
| *B60W 10/06* | (2006.01) | |
| *B60W 10/10* | (2012.01) | |
| *B60W 10/20* | (2006.01) | |
| *B60K 35/00* | (2006.01) | |
| *B60J 3/04* | (2006.01) | |
| *B60W 50/00* | (2006.01) | |

(52) U.S. Cl.
CPC .............. *B60W 50/082* (2013.01); *B60J 3/04* (2013.01); *B60K 35/00* (2013.01); *B60W 10/06* (2013.01); *B60W 10/10* (2013.01); *B60W 10/20* (2013.01); *B60W 50/08* (2013.01); *B60K 2350/2021* (2013.01); *B60K 2350/967* (2013.01); *B60W 2050/0066* (2013.01)

(58) Field of Classification Search
CPC ........ B60W 50/08; B60W 50/082; B60J 3/04; B60K 35/00; B60K 37/00; B60K 37/02; B60K 37/04

See application file for complete search history.

(56) References Cited

FOREIGN PATENT DOCUMENTS

| EP | 3031654 A1 * | 6/2016 | ............. B60K 35/00 |
|---|---|---|---|
| JP | 7-257228 A | 10/1995 | |

(Continued)

OTHER PUBLICATIONS

JP2009227018, translation 2009 (Year: 2009).*

(Continued)

*Primary Examiner* — Anne M Antonucci
*Assistant Examiner* — Renee LaRose
(74) *Attorney, Agent, or Firm* — Westerman, Hattori, Daniels & Adrian, LLP

(57) ABSTRACT

A vehicle control system comprises an automated driving controler for executing any of a plurality of driving modes which include an automated driving mode for automatically performing at least one of speed control and steering control of a vehicle and a manual driving mode for performing both of the speed control and the steering control based on operation of an occupant of the vehicle, and a visual field condition controller for controlling a front visual field condition of the vehicle based on the driving mode executed by the automated driving controller so as to be either a visible condition or a visual difficulty condition.

14 Claims, 16 Drawing Sheets

(56) References Cited

FOREIGN PATENT DOCUMENTS

| | | | |
|---|---|---|---|
| JP | 2009-227018 A | | 10/2009 |
| JP | 2009227018 A | * | 10/2009 |
| JP | 2013-095330 A | | 5/2013 |
| JP | 2015-217798 A | | 12/2015 |

OTHER PUBLICATIONS

Office Action dated Mar. 6, 2018, issued in counterpart Japanese Application No. 2016-101615, with English machine translation. (6 pages).

* cited by examiner

Fig. 3
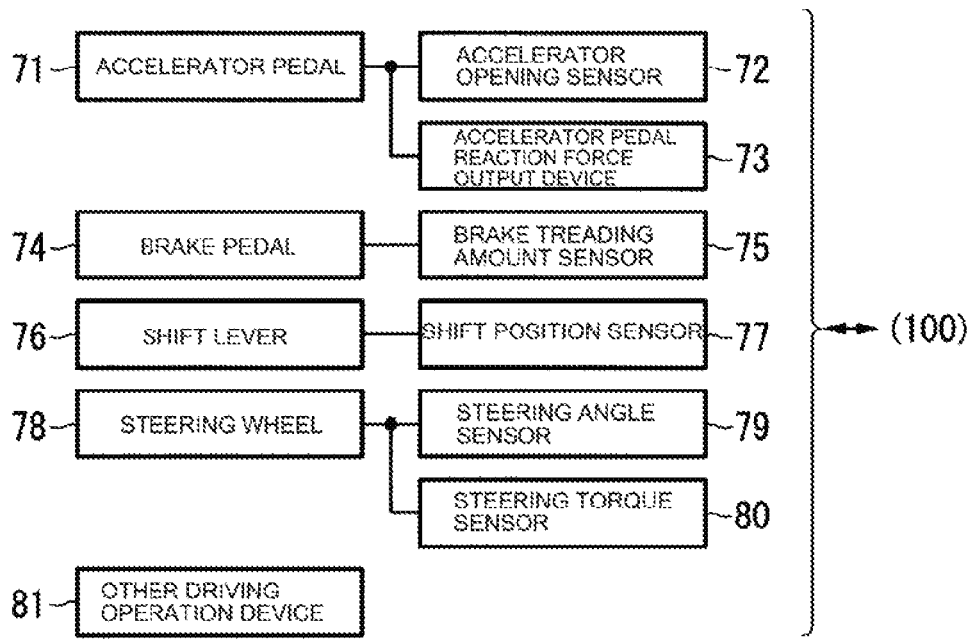
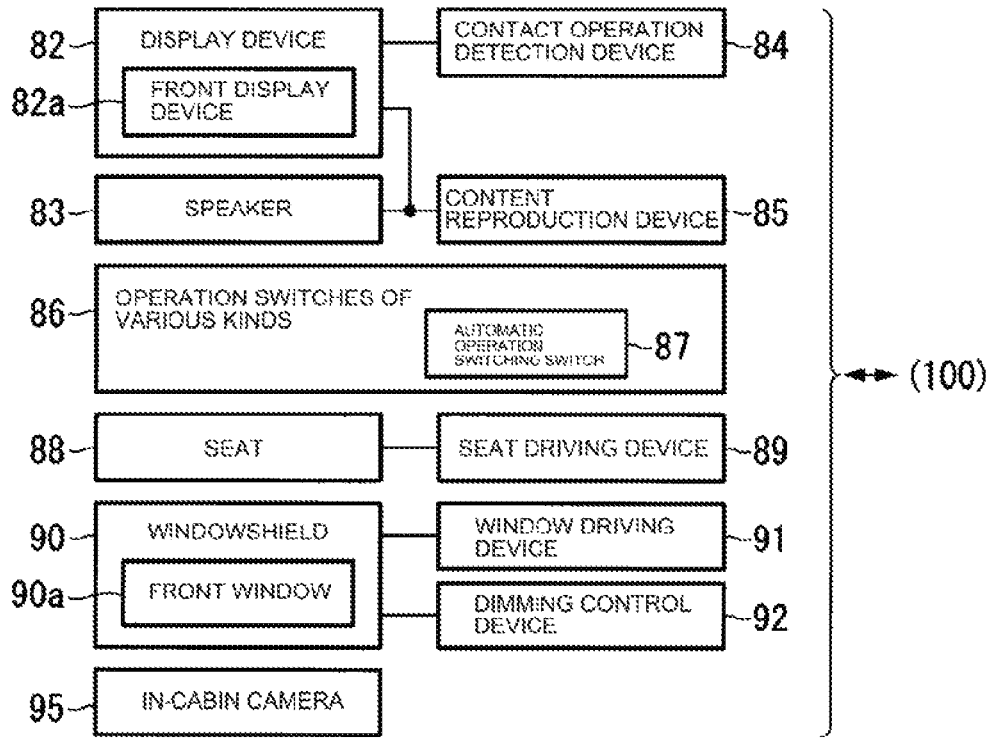

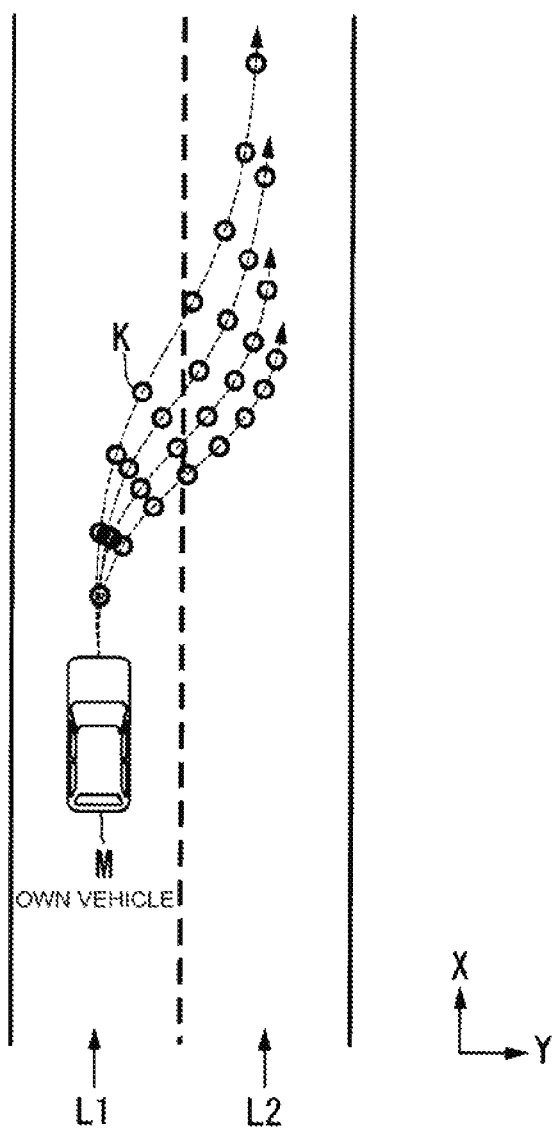

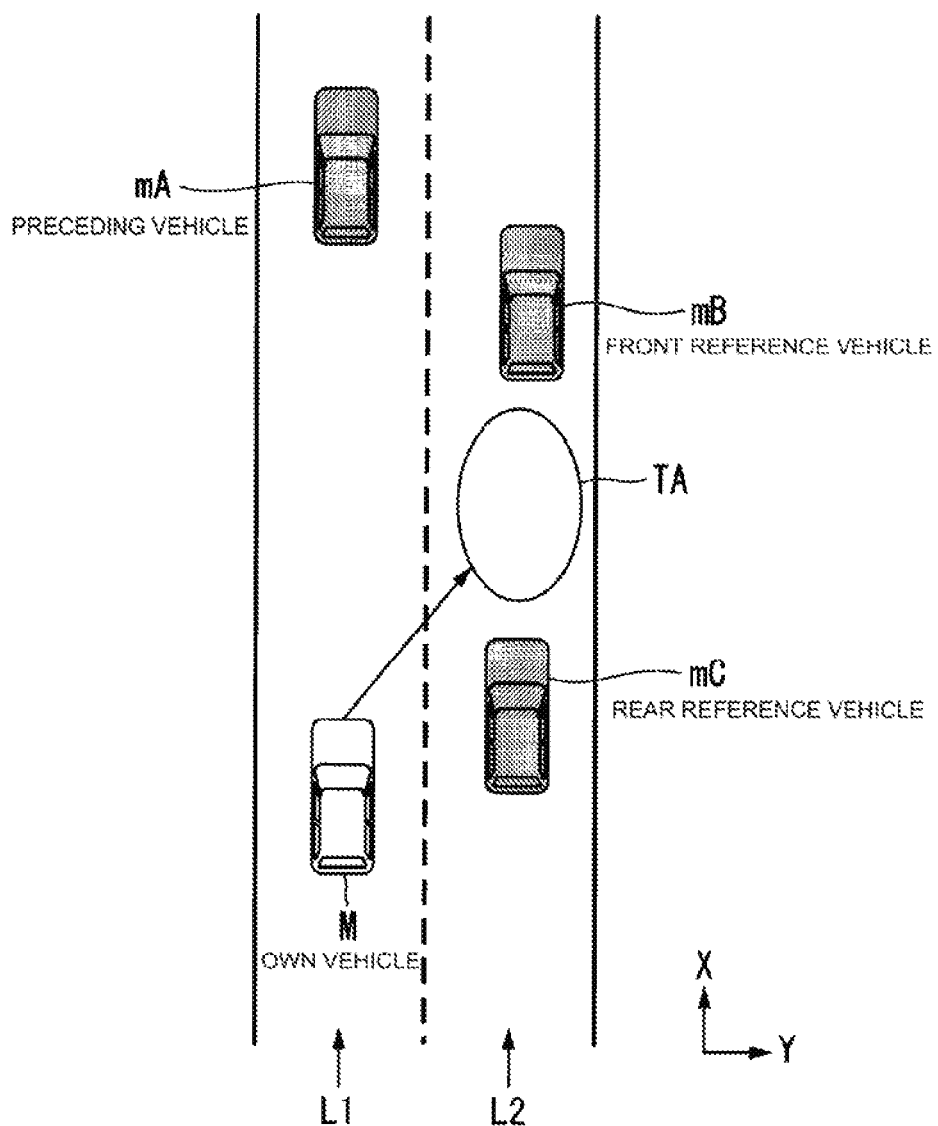

Fig. 10

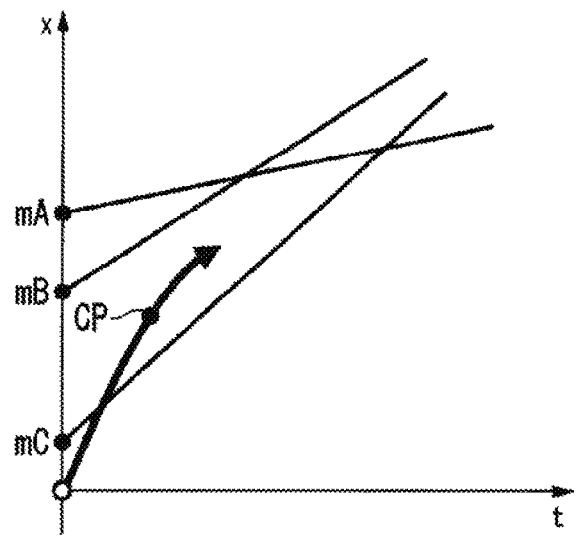

| OPERATION MODE<br>NON-DRIVING<br>OPERATION SYSTEM | MANUAL<br>OPERATION<br>MODE | AUTOMATED DRIVING MODE | | | ... |
| --- | --- | --- | --- | --- | --- |
| | | MODE A | MODE B | MODE C | |
| NAVIGATION OPERATION | NO | YES | YES | NO | ... |
| CONTENT REPRODUCTION OPERATION | NO | YES | NO | NO | ... |
| INSTRUMENT PANEL OPERATION | NO | YES | YES | YES | ... |
| ... | ... | ... | ... | ... | ... |

Fig. 12

FRONT WINDOW 90a

| | CONDITION | DISPLAYED ITEM | HUD DISPLAY AREA |
| --- | --- | --- | --- |
| MODE A | OPAQUE | ENTERTAINMENT IMAGE | LARGE |
| OTHER MODE | TRANSPARENT | NO DISPLAY | SMALL |

Fig. 19

FRONT WINDOW 90b

|  | CONDITION | DISPLAY ITEM |
|---|---|---|
| MODE A | OPACITY (SCREENED) | ENTERTAINMENT IMAGE |
| OTHER MODE | OPACITY (SCREENED) | CAMERA IMAGE |

VEHICLE CONTROL SYSTEM, VEHICLE CONTROL METHOD AND VEHICLE CONTROL PROGRAM

CROSS REFERENCES TO RELATED APPL1CATIONS

The present application claims priority under 35 U.S.C. § 119 to Japanese Patent Application No. 2016-101615, filed May 20, 2016, entitled "Vehicle Control System, Vehicle Control Method and Vehicle Control Program." The contents of this application are incorporated herein by reference in their entirety.

TECHNICAL FIELD

The present disclosure relates to a vehicle control system, a vehicle control method and a vehicle control program.

BACKGROUND

In recent years, research on technique (hereinafter, referred to as "automated driving") for automatically controlling at least one of the acceleration/deceleration and the steering of own vehicle is carried on. In connection with this, there is known a forward monitoring promotion device that promotes the forward monitoring by changing a dimming area of a window glass around a driver's seat to a frosted glass state unless a driver performs the forward monitoring during automatic driving operation (for example, see Japanese Patent Application Laid-Open publication No. 2013-095330).

SUMMARY

In the conventional technique, since the driver usually sets up the dimming area so as to be located in an area which is other area than an area for visually confirming a front-view, a front visual field of the driver is maintained in visually confirmable condition, Therefore, there may be oases where space corresponding to the front visual field of the driver cannot be utilized sufficiently.

I It is desirable to utilize the space corresponding to the front visual field of the driver sufficiently.

First aspect of the embodiments comprises an automated driving controller for executing any of a plurality of driving modes which include an automated driving mode for automatically performing at least one of speed control and steering control of the vehicle and a manual driving mode for performing both of the speed control and the steering control based on operation of an occupant of the vehicle, and a visual field condition controller for controlling a front visual field condition of the vehicle based on the driving mode executed by the automated driving controller so as to be either a visible condition or a visual difficulty condition.

According to second aspect, the visual field condition controller controls the front visual field condition of the vehicle so as to be the visual difficulty condition when the automated driving mode is executed by the automated driving controller, and controls the front visual field condition of the vehicle so as to be the visible condition when the manual driving mode is executed by the automated driving controller.

According to third aspect, the automated driving mode includes a plurality of modes which are different in degree of vehicle surroundings monitoring obligation imposed on the occupant of the vehicle, and the visual field condition controller controls the front visual field condition of the vehicle, based on the degree of the surroundings monitoring obligation of the automated driving mode executed by the automated driving controller, so as to be either the visible condition or the visual difficulty condition.

According to fourth aspect, the plurality of modes includes a mode in which the surroundings monitoring obligation of the vehicle does not arise, and the visual field condition controller controls the front visual field condition of the vehicle so as to be the visual difficulty condition when the mode in which the surroundings monitoring obligation of the vehicle does not arise is executed by the automated driving controller.

According to fifth aspect, a windshield is provided on a front side of the vehicle, and the visual field condition controller controls the front visual field condition of the vehicle so as to be the visual difficulty condition by opacifying the windshield when the mode in which the surroundings monitoring obligation of the vehicle does not arise is executed by the automated driving controller.

Sixth aspect further comprises a display controller for displaying a predetermined image corresponding to the opacified windshield.

Seventh aspect further comprises a camera for imaging a front of the vehicle, wherein an image imaged by the camera is displayed on the windshield by using the display controller in the process in which the visual field condition controller controls the front visual field condition of the vehicle from the visual difficulty condition to the visible condition.

Eighth aspect further comprises a front window through which a visual light is not transmitted being provided in the front side of the vehicle, and a camera for imaging a front of the vehicle, wherein the visual f ield condition controller controls the front visual field condition of the vehicle so as to be the visible condition by displaying an image imaged by the camera on the front window.

Ninth aspect further comprises a display device for displaying an image which has nothing to do with the front visual field of the vehicle, on a front window provided on the front side of the vehicle, when the front visual field condition of the vehicle is controlled by the visual field condition controller so as to be the visible condition.

According to tenth aspect, a vehicle control method comprises an on-vehicle computer, wherein the on-vehicle computer executes any of a plurality of modes which include an automated driving mode for automatically performing at least one of speed control and steering control of the vehicle and a manual driving mode for performing both of the speed control and the steering control based on operation of an occupant of the vehicle, and controls a front visual field condition of the vehicle so as to be either a visible condition or a visual difficulty condition, based on the executing driving mode.

According to eleventh aspect, a vehicle control program allows an on-board computer to execute any of a plurality of modes which include an automated driving mode for automatically performing at least one of speed control and steering control of the vehicle and a manual driving mode for performing both of the speed control and the steering control based on operation of an occupant of the vehicle, and to control a front visual field condition of the vehicle so as to be either a visible condition or a visual difficulty condition, based on the executing driving mode.

For example, the space corresponding to the front visual field of the driver can be utilized sufficiently.

BRIEF DESCRIPTION OF THE DRAWINGS

FIG. 3 is a configuration diagram of HMI 70;

FIG. 8 is a diagram representing, by trajectory points K, the examples of the trajectory candidates generated by the trajectory candidate generation part 146B;

FIG. 9 is a diagram showing a traveling lane change target-position TA;

FIG. 10 is a diagram showing a speed generation model when assuming that speeds of three peripheral vehicles are constant;

FIG. 11 is a diagram showing an example of operation propriety information 188 for each mode;

FIG. 12 is a diagram showing a condition of a front window 90a for each traveling mode;

FIG. 19 is a diagram showing the condition of a front window 90b for each traveling mode.

DETAILED DESCRIPTION

Hereinafter, embodiments of a vehicle control system, a vehicle control method and a vehicle control program according to the present disclosure will be explained with reference to drawings.

<Common Configuration>

Figure 1:
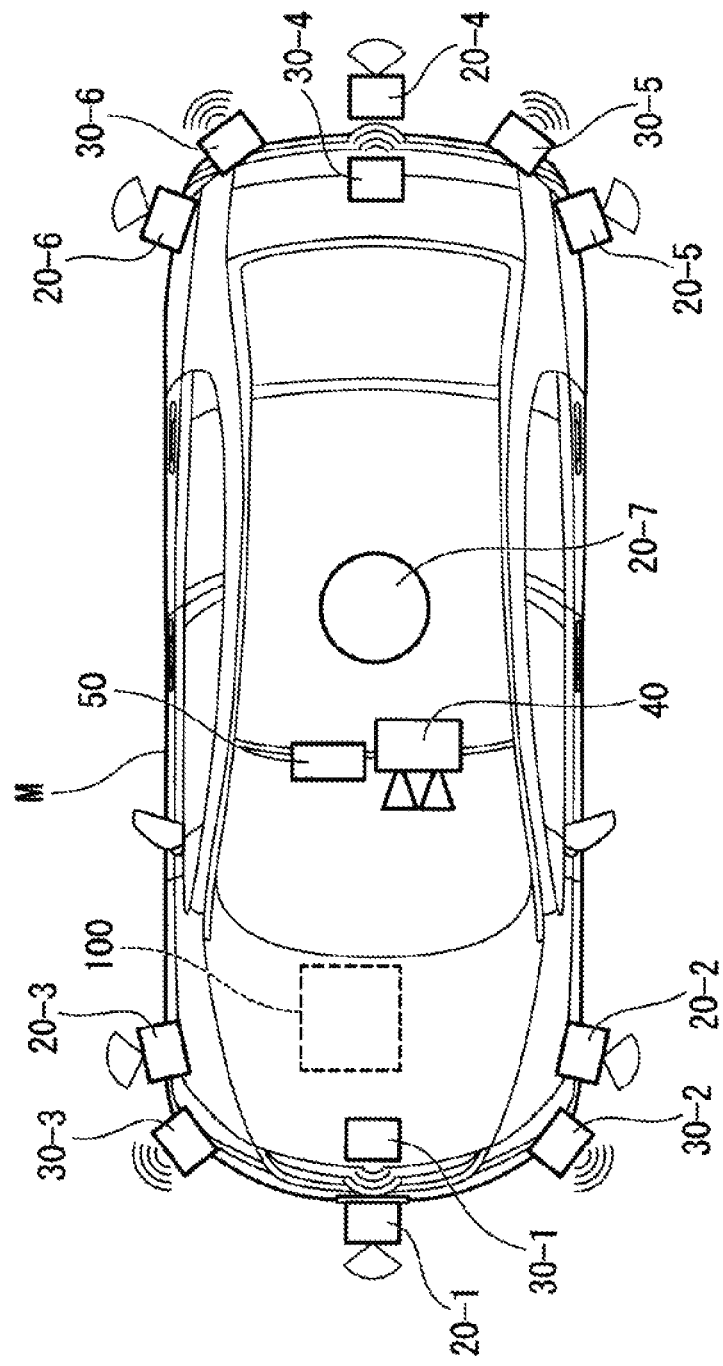
FIG. 1 is a diagram showing component elements of an own vehicle M of one embodiment.

FIG. 1 is a diagram showing component elements of a vehicle (hereinafter, referred to as an own vehicle M) on which a vehicle control system 100 according to each of the embodiments is mounted. The vehicle on which the vehicle control system 100 is mounted is a motor vehicle such as a two-wheeled vehicle, a three-wheeled vehicle, a four-wheeled vehicle and the like, for example, and includes an automobile which has an internal combustion engine such as a diesel engine, a gasoline engine and the like as a power source, an electric automobile which has an electric motor as the power source, a hybrid automobile which has both the internal combustion engine and the electric motor as the power source, and the like. The electric automobile is driven by using electric power which is discharged from a cell such as a secondary cell, a hydrogen fuel cell, a metal fuel cell, an alcohol fuel cell, etc., for example.

As shown in FIG. 1, on the own vehicle M there are mounted sensors such as finders 20-1 to 20-7, radars 30-1 to 30-6, a camera 40, etc, a navigation device 50, and the vehicle control system 100.

The finders 20-1 to 20-7 is L1DAR (Light Detection and Ranging or Laser Imaging Detection and Ranging) which measures the scattered light relative to the irradiation light, for example, and finds a distance to an object- For example, the finder 20-1 is mounted on a front grill or the like, and the finders 20-2 and 20-3 are mounted on a side surface of a vehicle body, a door mirror and an interior of a headlight or around a sidelight. The finder 20-4 is mounted on a trunk lid or the like, and the finders 20-5 and 20-6 are mounted on the side surface of the vehicle, an interior of a tail light or the like. Each of the above-mentioned finders 20-1 to 20-6, for example, has a detection area of about 150 degrees with respect to the horizontal direction, for example. Moreover, the finder 20-7 is mounted on a roof or the like. The finder 20-7 has a detection area of 360 degrees with respect to the horizontal direction, for example.

The radars 30-1 and 30-4 are long range millimeter wave radars of which detection areas in the depth direction are wider than other radars. Moreover, the radars 30-2, 30-3, 30-5 and 30-6 are medium range millimeter wave radars of which detection areas in the depth direction are narrower than the radars 30-1 and 30-4.

Hereinafter, the finders 20-1 to 20-7, unless otherwise specified, are simply referred to as "finder 20", and the radars 30-1 to 30-6, unless otherwise specified, are simply referred to as "radar 30". The radar 30 detects an object, for example, by FM-CW (Frequency Modulated Continuous Wave) system.

The camera 40 is a digital camera which utilises a solid state image sensing device such as CCD (Charge Coupled Device), CMOS (Complementary Metal Oxide Semiconductor) and the like, for example. The camera 40 is mounted on an upper portion of a front windshield, a back surface of a room mirror or the like. The camera 40 images the view in front of the own vehicle M in a periodically repeated manner, for example. The camera 40 may be a stereo camera which includes a plurality of cameras.

Herein, the configuration shown in FIG. 1 is only an example, so that a portion of the configuration may be omitted therefrom and another configuration may be added instead.

<First Embodiments>

Figure 2:
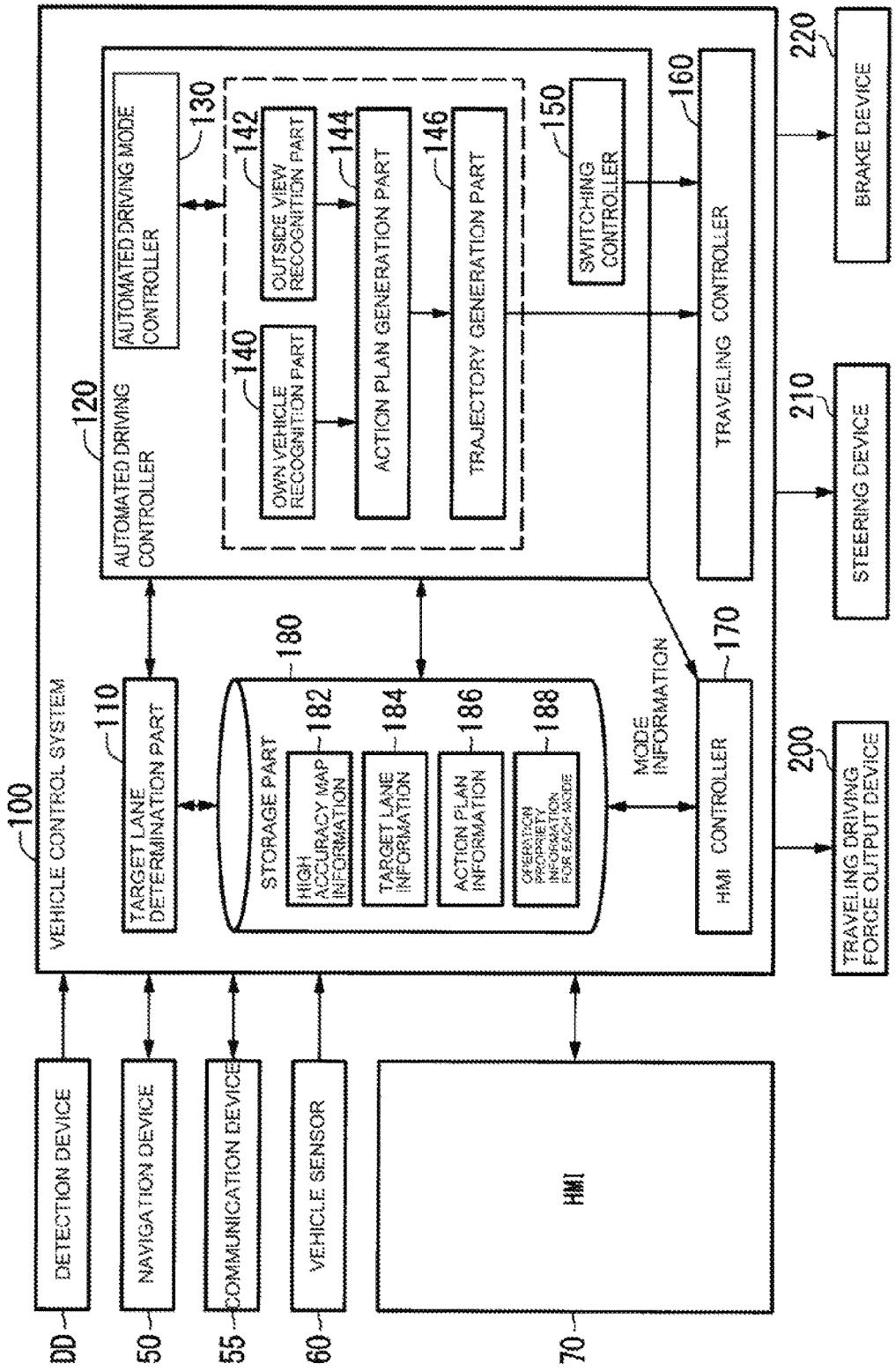
FIG. 2 is a function configuration diagram focusing on a vehicle control system 100.

FIG. 2 is a function configuration diagram focusing on the vehicle control system 100 in accordance with a first embodiment of the present disclosure. On the own vehicle M there are mounted a detection device DD including the finder 20, the radar 30, the camera 40 and the like, a navigation device 50, a communication device 55, a vehicle sensor 60, an HMI (Human Machine Interface) 70, the vehicle control system 100, a traveling driving force output device 200, a steering device 210 and a brake device 220. These devices ana equipment are connected to each other by multiple communication lines such as CAN (Controller Area Network) communication lines or the like, serial communication lines, radio communication networks, etc. By the way, the vehicle control system in claims is not limited to "the vehicle control system 100" only but may include other configuration (the detection device DD, the HMI 70, etc.) than the vehicle control system 100.

The navigation device 50 has a GNSS (Global Navigation Satellite System) receiver, map information (navigation map), a touch panel type display device functioning as a user interface, a speaker, a microphone and the like. The navigation device 50 identifies a position of the own vehicle M by the GNSS receiver and derives a route from that position to the destination designated by the user. The route derived by the navigation device 50 is provided to a target traveling lane determination part 110 of the vehicle control system 100. The position of the own vehicle M may be identified or complemented by an IMS (Inertial Navigation System) which utilizes output of the vehicle sensor 60. Further, the navigation device 50 performs guidance of the route to the destination by audio or navigation display when the vehicle control system 100 executes a manual driving mode. Herein, the configuration for identifying the position of the own vehicle Mmay be provided independent of the navigation device 50. Moreover, the navigation device 50 may be realized by the function of a terminal device such as a smartphone, a tablet terminal and the like held by the user, for example. In this case, the transmission and reception of the information are performed by the wireless or wire communication between the terminal device and the vehicle control system 100.

The communication device 55 performs the wireless communication utilizing for example a cellular network, Wi-Fi network, Bluetooth (®), DSRC (Dedicated Short Range Communication), etc.

The vehicle sensor 60 includes a vehicle speed sensor for detecting the vehicle speed, an acceleration sensor for detecting the acceleration, a yaw rate sensor for detecting angular velocity around a vertical axis, a direction sensor for detecting the direction of the own vehicle M, and the like.

FIG. 3 is a configuration diagram of the HMI 70. The HMI 70 is provided with the configuration of a driving operation system and the configuration of a non-driving operation system, for example. The boundary between them is not clear. The configuration of the driving operation system may have the function of the non-driving operation system, and vice versa.

The HMI 70 includes, as the configuration of the driving operation system, an accelerator pedal 71, an accelerator opening sensor 72, an accelerator pedal reaction force output device 73, a brake pedal 74, a brake treading amount sensor (or master cylinder pressure sensor) 75, a shift lever 76, a shift position sensor 77, a steering wheel 78, a steering angle sensor 79, a steering torque sensor 80, and other driving operation device 81, for example.

The accelerator pedal 71 is an operation component, for receiving an acceleration instruction by the vehicle occupant (or deceleration instruction by the returning operation). The accelerator opening sensor 72 detects the treading amount of the accelerator pedal 71 and outputs an accelerator opening signal indicating the treading amount to the vehicle control system 100. Herein, the signal may be outputted directly to the traveling driving force output device 200, the steering device 210 or the brake device 220, instead of being outputted to the vehicle control system 100. The same shall apply to the configuration of other driving operation system to be referred to hereunder. The accelerator reaction force output device 73 outputs force (operation reaction force) in the opposite direction to the operation direction, to the accelerator pedal 71 in accordance with the instruction, for example, from the vehicle control system 100.

The brake pedal 74 is an operation component for receiving the deceleration instruction by the vehicle occupant. The brake treading amount sensor 75 detects the treading amount (or treading force) of the brake pedal 74 and outputs a brake signal indicating a detection result, to the vehicle control system 100.

The shift lever 76 is an operation component for receiving a change instruction by the vehicle occupant of a shift stage. The shift position sensor 77 detects the shift stage instructed by the vehicle occupant and outputs a shift position signal indicating a detection result to the vehicle control system 100.

The steering wheel 78 is an operation component for receiving the instruction by the vehicle occupant of turning the steering wheel. The steering angle sensor 79 detects a steering angle of the steering wheel 78 and outputs a steering angle signal indicating a detection result, to the vehicle control system 100. The steering torque sensor 80 detects torque applied to the steering wheel 78 and outputs a steering torque signal indicating a detection result, to the vehicle control system 100.

The other driving operation device 81 is formed of, for example, a joy stick, a button, a dial switch, a GUI (Graphical User Interface) switch and the like. The other driving operation device 81 receives the acceleration instruction, the deceleration instruction, the turn instruction, etc. and outputs them to the vehicle control system 100.

The HMI 70 includes, as the configuration of the non-driving operation system, a display device 82, a speaker 83, a contact operation detection device 84, a content reproduction device 85, various kinds of operation switches 86, a seat 88, a seat operation device 89, a windshield 90, a window driving device 91, a dimming control device 92 and an in-cabin camera 95, for example. The display device 82 of the non-driving operation system of the HMI 70 is an example of "a display controller".

The display device 82 is an LCD (Liquid Crystal Display), an organic EL (electroluminescence) display device or the like to be mounted on each portion of an instrument panel, optional locations or the like facing toward the passenger seat or rear seat. The display device 82 includes a front display device 82a which displays an image corresponding to a front window 90a. The front display device 82a may be an HUD (Head Up Display) which projects the image on the front window 90a or a liquid crystal display device (those that can be made transparent) which is embedded in the front window 90a. The speaker 83 outputs a voice. The contact operation detection device 84 detects a contact position (touch position) of a display screen of the display device 82 thereby to output it to the vehicle control system 100 in the case where the display device 82 including the front display device 82a is a touch panel. Herein, when the display device 82 is not the touch panel, the contact operation detection device 84 may be omitted.

The content reproduction, device 85 includes a DVD (Digital Versatile Disc) reproduction device, a CD (Compact Disc) reproduction device, a television receiver, a generation device of various kinds of guide images and the like, for example. Some or all of the display device 82, the speaker 83, the contact operation detection device 84 and the content reproduction device 85 may be formed in the configuration which is in common with the navigation device 50.

The various kinds of operation switches 86 are arranged in optional locations within an interior of the vehicle. An automated driving switching switch 87 which instructs a start (or start in the future) and stop of the automated driving is included in the various kinds of operation switches 86.

The automated driving switching switch 87 may be any of a GUI (Graphical User Interface) switch and a mechanical switch. Further, the various kinds of operation switches 86 may include switches for driving a seat operation device 89 and a window operation device 91.

The seat 88 is a seat on which the vehicle occupant is seated. The seat operation device 89 operates freely a reclining angle, a position in the forward and rearward direction, a yaw angle, etc. of the seat 88. The windshield 90 is provided in each of the doors, the front side and rear side of the vehicle, for example. The windshield 90 includes the front window 90a provided on the front side of the vehicle.

The windshield 90 including the front window 90a is formed in such a configuration that a dimming film is sandwiched by two glass sheets (or transparent resin sheets), for example. Moreover, the windshield 90 may be configured in such a manner as to stick the dimming film on one surface of the glass sheet (transparent resin sheet) functioning as a base. The window driving device 91 opens and closes the windshields 90 which are provided in each of doors, for example.

The dimming control device 92 controls the degree of transparency of the windshield 90. The dimming control device 92 may have the same configuration as the front display device 82a and may have a different configuration. For example, the dimming control device 92 controls the transmittance of a glass by impressing a voltage on the dimming film of the windshield 90 and controlling orientation of liquid crystal particles (liquid crystal molecules) of an interior of the dimming film. For example, the dimming control device 92 makes the orientation of the liquid crystal particles of the interior of the dimming film uneven thereby to deteriorate the transmittance of the glass and changes a part or the whole of the windshield 90 into a ground grass state or a frosted glass state. Further, the dimming control device 92 may control a hue of the windshield 90. For example, the dimming control device 92 controls the transmittance of the light of a specific wavelength by controlling the orientation of the liquid crystal particles of the interior of the dimming film and may change the hue of the windshield 90 from a transparent color to a color such as blue or black. Hereinafter, in the following explanation, when the windshield 90 is opacified by changing into the ground glass state or the frosted glass state or other color than the transparent color, this condition is referred to as "visual difficulty condition", and the condition other than this condition is referred to as "visible condition".

The in-cahin camera 95 is the digital camera utilizing the solid state image sensing device such as the CCD, the CMOS and the like. The in-cabin camera 95 is mounted in a position in which at least a head of the vehicle occupant who performs the driving operation can be imaged, such as a rear-view mirror, a steering boss part, the instrument panel and the like. The camera 40 images the vehicle occupant, for example, in a periodically repeated manner.

Prior to the explanation of the vehicle control system 100, the traveling driving force output device 200, the steering device 210 and the brake device 220 will be explained.

The traveling driving force output device 200 outputs traveling driving force (torque) for traveling the vehicle, to driving wheels. The traveling driving force output device 200 is provided with the engine, a transmission and an engine ECO (Electronic Control Unit) for controlling the engine in the case where the own vehicle M has the internal combustion engine as the power source. Similarly, if. is provided with a traveling motor and a motor ECO for controlling the traveling motor in the case where the own vehicle M is an electric vehicle having an electric motor as the power source, and provided with the engine, the transmission, the engine ECU, the traveling motor and the motor ECU in the case where the own vehicle M is the hybrid automobile, for example. When the traveling driving force output device 200 has only the engine, the engine ECU adjusts a throttle opening of the engine, the shift stage and the like in accordance with information inputted from a traveling controller 160 to be referred to later. When the traveling driving force output device 200 has only the traveling motor, the motor ECU adjusts a duty ratio of the PWM signal given to the traveling motor in accordance with the information inputted to the traveling controller 160. When the traveling driving force output device 200 has the engine and the traveling motor, the engine ECU and the motor ECU control the traveling driving force in cooperation with each other in accordance with the information inputted from the traveling controller 160.

The steering device 210 is provided with a steering ECU and an electric motor, for example. The electric motor changes the direction of a turning wheel by acting force on a rack and pinion mechanism, for example. The steering ECU operates the electric motor in accordance with the information inputted from the vehicle control system 100 or the information of the inputted steering angle or the steering torque thereby to change the direction of the turning wheel.

The brake device 220 is an electric servo brake device which is provided with a brake caliper, a cylinder for transmitting oil pressure to the brake caliper, an electric motor for generating the oil pressure in the cylinder, and a braking controller, for example. The braking controller of the electric servo brake device controls the electric motor in accordance with the information inputted from the traveling controller 160 so as to output the brake torque in response to the braking operation, to each of the wheels. The electric servo brake device may be provided as a backup with a mechanism which transmits the oil pressure generated by the operation of the brake pedal, to the cylinder through a master cylinder. Herein, the brake device 220 is not limited to the above-mentioned electric servo brake device but may be an electronic control type hydraulic brake device. The electronic control type hydraulic brake device controls an actuator in accordance with the information inputted from the traveling controller 160 thereby to transmit the oil pressure of the master cylinder to the cylinder. Further, the brake device 220 may include a regenerative brake device by the traveling motor which may be included in the traveling driving force output device 200.

[Vehicle Control System]

The vehicle control system 100 will be explained hereunder. The vehicle control system 100 is realized by one or more processors or hardware which has an equivalent function thereto, for example. The vehicle control system 100 may be composed of a combination of the processor such as a CPU (Central Processing Unit) or the like, a memory system, the ECU (Electronic Control Unit) to which the communication interface is connected through an internal bus, an MPU (Micro-Processing Unit), etc.

Referring again to FIG. 2, the vehicle control system 100 is provided with the target traveling lane determination part 110, an automated driving controller 120, the traveling controller 160, an HMI controller 170 and a storage part 180, for example. The automated driving controller 120 is provided with an automated driving mode controller 130, an own vehicle recognition part 140, an outside view recognition part 142, an action plan generation part 144, a trajectory generation part 146 and a switching controller 150, for example. The combination of the dimming control device 92 and the HMI controller 170 in the non-driving operation system of the HMI 70 as mentioned above is an example of "a visual field controller". As mentioned before, the configuration designating "the visual field condition controller" may overlap with the configuration designating "the display controller".

The target traveling lane determination part 110, each part of the automated driving controller 120, and a part or the whole of the traveling controller 160 are realized at the time the processors execute programs (software). Further, a part or the whole of these may be realized by hardware such as an LSI (Large Scale Integration), an ASIC (Application Specific Integrated Circuit) and the like and may be realized by a combination of the software and the hardware.

In the storage part 180 there is stored the information such as high accuracy map information 182, target traveling lane information 184, action plan information 186, operation propriety information 188 for each mode and the like, for example. The storage part 180 is realized by an ROM (Read Only Memory), an RAM (Random Access Memory), an HDD (Hard Disk Drive), a flash memory and the like. A program executed by the processor may be stored in the storage part 180 in advance and may be downloaded from an external device through on-vehicle internet equipment, etc. In addition, the program may be installed in the storage part. 180 when a portable storage medium which stores the program is installed in a drive device (not shown). Further, the vehicle control system 100 maybe decentralized into a plurality of computer devices.

The target traveling lane determination part 110 is realized by the MPU, for example. The target traveling lane determination part 110 divides the route provided from the navigation device 50, into a plurality of blocks (for example, the route is divided at intervals of 100 [m] in the traveling direction of the vehicle) and determines the target traveling lane for each of the blocks by referring to the high accuracy map information 132. The target traveling lane determination part 110 determines what traveling lane in the order from the left to be traveled, for example. In the case where a branch point and a junction exist in the route, the target traveling lane determination part 110 determines a target traveling lane in such a manner as to allow the own vehicle M to be traveled along the rational traveling route for moving toward the branch of destination, for example. The target traveling lane determined by the target traveling zone determination part 110 is stored in the storage part ISO as the target traveling lane information 184.

The high accuracy map information 182 is map information which is higher in accuracy than a navigation map of the navigation device 50. The high accuracy map information 182 includes the information of a center of the traveling lane or the information of a boundary of the traveling lane, for example. Further, road information, traffic regulation information, address information (address, postal code), facility information, telephone number information and the like may be included in the high accuracy map information 182. In the road information there are included information which indicates a classification of the road such as a superhighway, a paying motorway, a national road and a prefectural road, the number of travelinq lanes of the road, a width of each travelinq lane, an inclination of the road, a position of the road (three-dimensional coordinates including longitude, latitude and height), a curvature of a curve of the traveling lane, positions of the junction and the branch point of the travelinq lane, a mark or siqn provided in the road, and the like. In the traffic regulation information there is included the information that the traveling lane is blocked due to a construction, a traffic accident, a traffic jam, etc.

The automated driving mode controller 130 determines the automated driving mode to be executed by the automated driving controller 120. The modes of the automated driving in this embodiment include the following modes. Herein, the following modes are only examples and the number of modes of the automated driving may be freely determined.

[Mode A]

The mode A is a mode of the hiqhest degree of automated driving. When the mode A is executed, all the vehicle control such as complicated merging control, etc. is automatically performed, so that the vehicle occupant is not required to monitor the surroundings and the condition of the own vehicle M.

[Mode B]

The mode B is a mode of higher degree of the automated driving to be ranked next to the mode A. When the mode B is executed, in principle, although all the vehicle control is automatically performed, the driving operation of the own vehicle M is entrusted to the vehicle occupant as the need arises. Therefore, the vehicle occupant is required to monitor the surroundings and the condition of the own vehicle M.

[Mode C]

The mode C is a mode of high degree of the automated driving to be ranked next to the mode B. When the mode C is executed, the vehicle occupant is required to perform confirming operation according to scenes, in relation to the HMI 70. In the mode C, for example, in the case where the timing of the traveling lane change is communicated to the vehicle occupant and the vehicle occupant performs the operation for instructing the HMI 70 on the traveling lane change, the automatic traveling lane change is performed. Therefore, the vehicle occupant is required to monitor the surroundings and the condition of the own vehicle M.

The automated driving mode controller 130 determines the mode of the automated driving based on the operation of the vehicle occupant relative to the HMI 70, an event determined by the action plan generation part 144, a traveling mode determined by the trajectory generation part 146, etc. The mode of the automated driving is communicated to the HMI controller 170. Further, the limit corresponding to the performance of the detection device DD of the own vehicle M maybe set up with respect to the mode of the automated driving. For example, when the detection device DD is low in performance, it. is possible to set. up such that the mode A is not executed. In any of these modes, it is possible to switch the mode to the manual driving mode (override) by the operation relative to the configuration of the driving operation system in the HMI 70.

The own vehicle position recognition part 140 of the automated driving controller 120 recognizes the traveling lane in which the own vehicle M travels (traveling lane) and the relative position of the own vehicle M with respect to the traveling lane based on the high accuracy map information 182 stored in the storage part 180 and the information inputted from the finder 20, the radar 30, the camera 40, the navigation device 50 or the vehicle sensor 60.

The own vehicle recognition part 140 recognizes the traveling lane by comparing a pattern (for example, arrangement of solid lines and broken lines) of road division lines recognized from the high accuracy map information 182 and a pattern of the road division lines around the own vehicle M recognized from the image imaged by the camera 40, for example. In this recognition, it is possible to take into account the position of the own vehicle M obtained from the navigation device 50 and the processing result by the INS.

Figure 4:
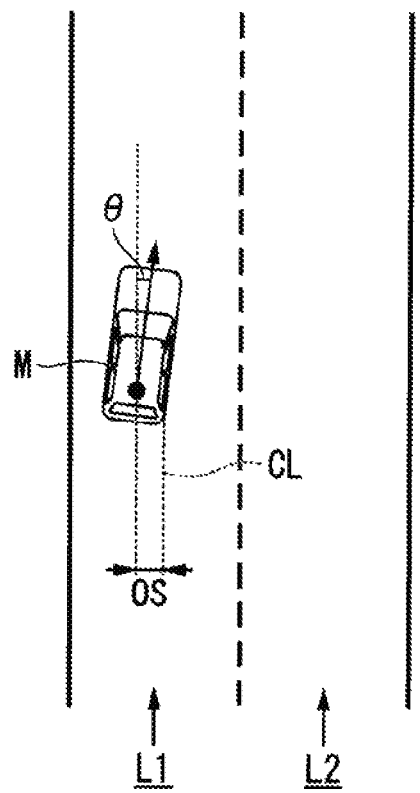
FIG. 4 is a diagram showing a state in which a relative position of the own vehicle M with respect to a traveling lane L1 is recognized by an own vehicle position recognition part 140.

FIG. 4 is a diagram showing a state in which the relative position of the own vehicle M with respect to a traveling lane L1 is recognized by an own vehicle position recognition part 140, The own vehicle recognition part 140 recognizes a deviation OS of a reference point (for example, center of gravity) of the own vehicle M from a center CL of the traveling lane, and an angle θ of the traveling direction of the own vehicle M to a line of the center CL of the traveling lane, as the relative position of the own vehicle M with respect to the traveling lane L1, for example. Herein, alternatively, the own vehicle position recognition part 140 may recognize the position of the reference point of the own vehicle M with respect to either of side end portions of the traveling lane L1 of the own vehicle, etc, as the relative position of the own vehicle M with respect to the traveling lane L1. The relative position of the own vehicle M recognized by the own vehicle position recognition part 140 is provided to the target traveling lane determination part 110.

The outside view recognition part 142 recognizes the condition of the position, the speed, the acceleration and the like of the peripheral vehicle, based on the information inputted from the finder 20, the radar 30, the camera 40, etc. The peripheral vehicle designates the traveling vehicle around the own vehicle M and the vehicle which travels in the same direction as the own vehicle M, for example. The position of the peripheral vehicle may be indicated by representative points of the center of gravity, corners or the like of the other vehicle and may be indicated by a region represented by contours of the other vehicle. "The condition" of the peripheral vehicle may include the acceleration of the peripheral vehicle and whether or not the traveling lane is changed (or whether or not the traveling lane is about to be changed), which are grasped based on the information of the above various devices. Further, the outside view recognition part 142 may recognize the positions of a guardrail, a utility pole, a parked vehicle, a pedestrian, and other objects in addition to the peripheral vehicles.

The action plan generation part 144 is configured to set up a start point of the own vehicle M and/or a destination of the automated driving. The start point of the automated driving may be a present position of the own vehicle M and may be a point at which the operation instructing the automated driving has been executed. The action plan generation part 144 generates the action plan with respect to a section between the start point and the destination of the automated driving. Herein, the action plan generation part 144 may generates the action plan with respect to an optional section, without being limited to the above section.

The action plan is composed of a plurality of events which are executed successively, for example. In the events there are included a deceleration event for decelerating the own vehicle M, an acceleration event for accelerating the own vehicle M, a lane keeping event for allowing the own vehicle M to travel without deviating from the traveling lane, a traveling lane change event for changing the traveling lane, a passing event for allowing the own vehicle M to pass a vehicle which travels ahead, a branch event for changing the traveling lane to a desired traveling lane at the branch point and allowing the own vehicle M to travel without deviating from the present traveling lane, a junction event for accelerating and decelerating the own vehicle M in a junction traveling lane for merging into amain lane, so as to change the traveling lane, a handover event for switching from the manual driving mode to the automated driving mode at the start point of the automated driving and switching from the automated driving mode to the manual driving mode at a predetermined end point of the automated driving, etc., for example. The action plan generation part 144 sets up the traveling lane change event, the branch event or the junction event at a point at which the target traveling lane determined by the target traveling lane determination part 110 is switched. The information indicating the action plan generated by the action plan generation part 144 is stored in the storage part 180 as the action plan information 186.

Figure 5:
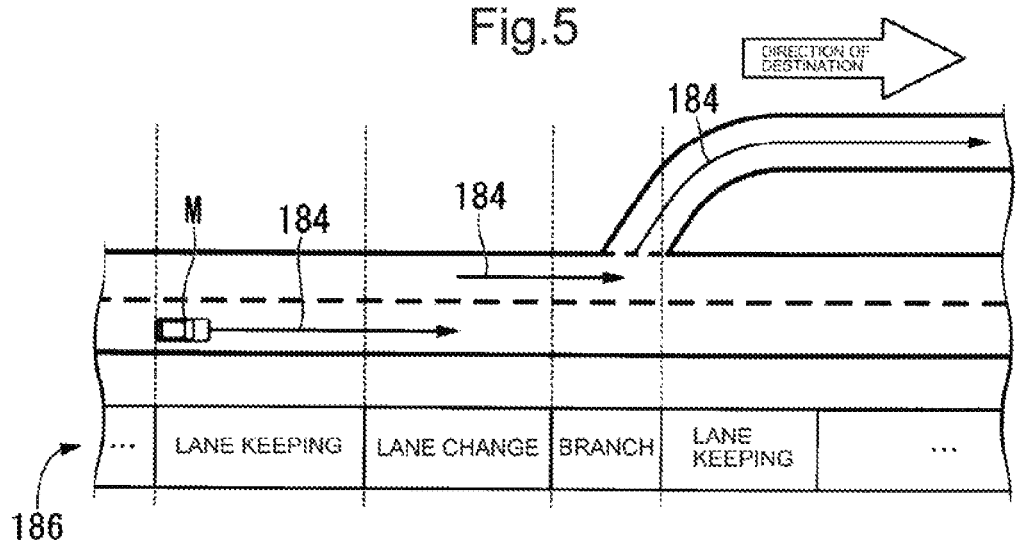
FIG. 5 is a diagram showing an example of an action plan generated for a certain section.

FIG. 5 is a diagram showing an example of the action plan generated for a certain section. As shown in the drawing, the action plan generation part 144 generates the action plan for allowing the own vehicle M to travel along the target travel lane indicated by the target travel lane information 184. Herein, in spite of the target traveling lane information 184, the action plan generation part 144 may change dynamically the action plan according to the change of the condition of the own vehicle M. For example, the action plan generation part 144 changes the event which is set up in the operation section in which the own vehicle M is scheduled to travel, in the case where the speed of the peripheral vehicle recognized by the outside view recognition part 142 during the traveling of the vehicle exceeds the threshold value or where the moving direction of the peripheral vehicle which travels the traveling lane contiguous to the own traveling lane turns to the direction of the own traveling lane. For example, in the case where the traveling lane change event is set up so as to be executed after the lane keeping event, when it is confirmed by the recognition result of the outside view recognition part 142 that, during the lane keeping event, the vehicle has come at the speed more than the threshold value from the rearward direction of the traveling lane to which the traveling lane change is scheduled, the action plan generation part 144 may change the next event of the lane keeping event from the traveling lane change event to the deceleration event or the lane keeping event or the like. As a result, the vehicle control system 100 allows the own vehicle M to automatically travel safely also when the condition of the outside view is changed.

Figure 6:
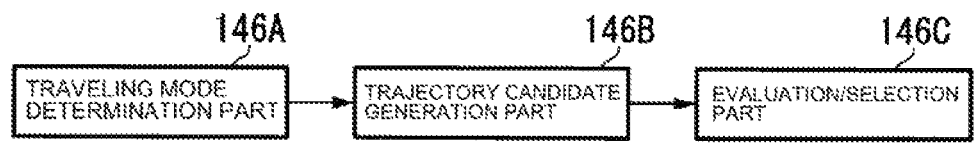
FIG. 6 is a diagram showing an example of a configuration of a trajectory generation part 146.

FIG. 6 is a diagram showing an example of a configuration of the trajectory generation part 146. The trajectory generation part 146 is provided with a traveling mode determination part 146A, a trajectory candidate generation part 146B arid an evaluation and selection part 146C, for example.

The traveling mode determination part 146A determines any of constant-speed traveling, follow-up traveling, low-speed follow-up traveling, deceleration traveling, curve traveling, obstacle avoiding traveling, etc., when the lane keeping event is executed, for example. In this case, the traveling mode determination part 146A determines the traveling mode to be the constant-speed traveling when the other vehicle does not. exist in front of the own vehicle M. Moreover, the traveling mode determination part 146A determines the traveling mode to be the follow-up traveling when the follow-up traveling is performed with respect to the preceding vehicle which travels ahead of the own vehicle M. Similarly, the traveling mode determination part 146A determines the traveling mode to be the low-speed follow-up traveling in the case of the traffic jam or the like. Further, the traveling mode determination part 146A determines the traveling mode to be the deceleration traveling when the deceleration of the preceding vehicle is recognized by the outside view recognition part 142, or when the event such as the stopping of the vehicle, the parking of the vehicle or the like is executed. Further, the traveling mode determination part 146A determines the traveling mode to be the curve traveling when the outside view recognition part 142 has recognized that the own vehicle M entered the curved road.

Further, the traveling mode determination part 146A determines the traveling mode to be the obstacle avoiding traveling when the obstacle has been recognized in front of the own vehicle M by the outside view recognition part 142. In addition, in the case where the traveling lane change event, the passing event, the branch event, the junction event, the handover event, etc. are executed, the traveling mode determination part 146A determines the traveling mode in accordance with each of these events.

Figure 7:
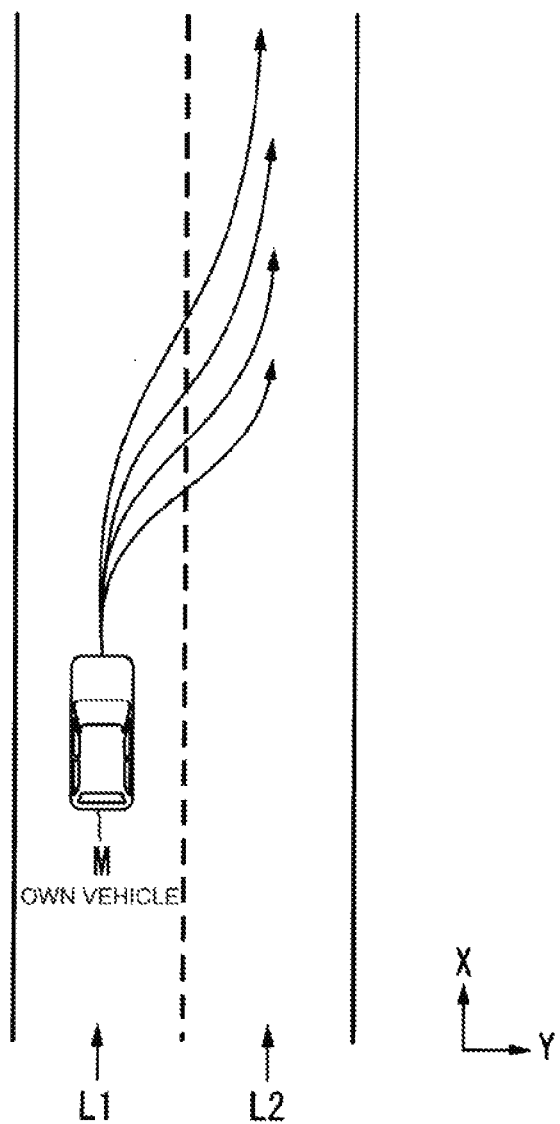
FIG. 7 is a diagram showing examples of trajectory candidates generated by the trajectory candidate generation part 146B.

The trajectory candidate generation part 146B generates the candidate of the trajectory based on the traveling mode determined by the traveling mode determination part 146A. FIG. 7 is a diagram showing an example of the candidate of the trajectory generated by the trajectory candidate generation part 146B. FIG. 7 indicates the candidate of the trajectory which is generated in the case where the own vehicle M changes the traveling lane from the traveling lane L1 to the traveling lane L2.

The trajectory candidate generation part 146B determines the trajectories as indicated in FIG. 7 to be a group of target positions (trajectory points K) that the reference position (for example, the center of gravity or a center of a rear wheel shaft) of the own vehicle M should reach at every prescribed time interval in the future, for example. FIG. 8 is a diagram representing, by the trajectory points K, the examples of the trajectory candidates generated by the trajectory candidate generation part 146B. The speed of the own vehicle M becomes faster as a space between the trajectory points K is wider, and the speed of the own vehicle M becomes slower as the space between the trajectory points K is narrower. Accordingly, the trajectory candidate generation part 146B widens the space between the trajectory points K gradually in the case of acceleration and narrows the space between the trajectory points gradually in the case of deceleration.

Like this, since the trajectory point K includes a speed component, the trajectory candidate generation part 146B is required to give the target speed to each of the trajectory points K. The target speed is determined according to the traveling mode which is determined by the traveling mode determination part 146A.

Herein, the determination method of the target speed in the case of performing the change of the traveling lane (including the branch) will be explained. First, the trajectory candidate generation part 146B sets up a target position of the traveling lane change (or a junction target position). The traveling lane change target position is set up as a relative position with respect to the peripheral vehicle, and "the space between the peripheral vehicles to perform the traveling lane change" is determined. The trajectory candidate generation part 146B focuses on three peripheral vehicles with reference to the traveling lane change target position and determines the target speed in the case of changing the traveling lane. FIG. 9 is a diagram showing a traveling lane change target position TA. In the drawing, L1 designates the own traveling lane, and the L2 designates the neighboring traveling lane. The peripheral vehicle which travels just in front of the own vehicle M in the same traveling lane as the own vehicle M is defined as a preceding vehicle mA, the peripheral vehicle which travels just in front of the traveling lane change target position TA is defined as a front reference vehicle mB, and the peripheral vehicle which travels just behind the traveling lane change target position TA is defined as a rear reference vehicle mC. Although the own vehicle M is required to perform acceleration and deceleration in order to move up to the lateral side of the traveling lane change target position TA, it has to avoid catching up with the preceding vehicle mA at that time. Therefore, the trajectory candidate generation part 146B forecasts the condition in the future of the three peripheral vehicles, whereby to determine the target speed so as to prevent interference with each of the peripheral vehicles.

FIG. 10 is a diagram showing a speed generation model when assuming that the speeds of the three peripheral vehicles are constant. In the drawing, straight lines extending from mA, mB and mC designate displacement, in the traveling direction when assuming that each of the peripheral vehicles travels at a constant speed. The own vehicle M, at a point CP at which the traveling lane change is completed, is located between the front reference vehicle mB and the rear reference vehicle mC and has to be located behind the preceding vehicle mA before that point. Under such a restriction, the trajectory candidate generation part 146B derives a plurality of time-series patterns of the target speeds before the travel lane change is completed. Then, when the time-series patterns of the target speeds are applied to models such as spline curves or the like, the plurality of trajectory candidates as shown in FIG. 8 are derived. Herein, the operation patterns of the three peripheral vehicles are not limited to the constant, speeds as shown in FIG. 10 but may be forecasted based on constant acceleration and a constant jerk (jerk degree).

The evaluation and selection part 146C evaluates the trajectory candidate generated by the trajectory candidate generation part 146B, for example, from two viewpoints of planning and safety, and selects the trajectory to be outputted to the traveling controiier 160. From the viewpoint of the planning, for example, the followability to the previously generated plan (for example, action plan) is high, and the trajectory Is evaluated at a high level when the overall length of the trajectory is short. For example, in the case where the travel lane change in the right direction is desired, the trajectory configured such that the traveling lane is once changed in the left direction and returned is low in evaluation. From the viewpoint of the safety, for example, the evaluation is high as the distance between the own vehicle M and the object (peripheral vehicle, etc.) is long and the change amount of the acceleration/deceleration speed or the steering angle or the like decreases in each of the trajectory points.

The switching controller 50 switches the automated driving mode and the manual driving mode to each other based on the signal inputted from the automated driving switching switch 87. Moreover, the switching controller 150 switches the automated driving mode to the manual driving mode based on the operation instructing the acceleration, the deceleration or the steering with respect to the configuration of the driving operation system of the HMI 70. For example, the switching controller 150 switches the automated driving mode to the manual driving mode (override) in the case where the condition in which the operation amount indicated by the signal inputted from the configuration of the driving operation system of the HMI 70 exceeds the threshold value continues more than the reference time. Further, the switching controller 150 may be configured to perform a return to the automated driving mode in the case where the operation with respect to the configuration of the driving operation system of the HMI 70 has not. been detected during the predetermined time after switching to the manual driving mode due to the override.

The traveling controller 160 controls the traveling driving force output device 200, the steering device 210 and the brake device 220 in such a manner that the own vehicle M passes through the trajectory generated by the trajectory generation part 146 in accordance with the scheduled time, The HMI controller 170 refers to the operation propriety information 188 for each mode and controls the HMI 70 according to the classification of the automated driving, when the information of the mode for the automated driving is communicated by the automated driving controller 120.

FIG. 11 is diagram showing an example of the operation propriety information 188 for each mode. The operation propriety information 188 for each mode shown in FIG. 11 has "the manual driving mode" and "the automated driving mode" as an item of the automated driving. Moreover, it has the above-mentioned "mode A", "mode B", "mode C", and the like as "the automated driving mode". Further, the operation propriety information 188 for each mode has, as an item of the non-driving operation system, "navigation operation" which is the operation relative to the navigation device 50, "content reproduction operation" which is the operation relative to the content reproduction device 85, "instrument panel operation" which is the operation relative to the display device 82, and the like. In the example of the operation propriety information 188 for each mode as shown in FIG. 11, although the propriety of operation of the vehicle occupant relative to the non-driving operation system for each of the above-mentioned driving modes is set up, the targeted interface device is not limited to that.

The HMI controller 170 judges the device allowed to be used (the navigation device 50, a part or the whole of the HMI 70) and the device not allowed to be used, by referring to the operation propriety information 188 for each mode based on the information of the modes obtained from the automated driving controller 120. Further, the HMI controller 170 controls, based on the result of judgment, the propriety of the reception as to the operation of the vehicle occupant relative to the HMI 70 or the navigation device 50 of the non-driving operation system.

For example, when the driving mode executed by the vehicle control system 100 is the manual driving mode, the vehicle occupant operates the configuration of the driving operation system of the HMI 70 (for example, the accelerator pedal 71, the brake pedal 74, the shift lever 7 6 and the steering wheel 78 or the like). Moreover, when the driving mode executed by the vehicle control system 100 is the mode B or the mode C or the like of the automated driving mode, the surroundings monitoring obligation of the own vehicle M is imposed on the vehicle occupant. In such a case, in order to pr event attention of the vehicle occupant from becoming distracted (driver distraction) by the action (for example, the operation of the HMI 70, etc.) other than the driving, the HMI controller 170 performs such a control that the operation relative to a part, or the whole of the non-driving operation system of the HMI 70 is not received. At that time, the HMI controller 170, in order to monitor the surroundings of the own vehicle M, allows the display device 82 to display as an image or the like the existence of the peripheral vehicle around the own vehicle M recognized by the outside view recognition part 142 and the condition of the peripheral vehicle so that it may allow the HMI 70 to receive the confirming operation according to the scenes during the traveling of the own vehicle M.

Further, the HMI controller 170 relaxes the control of the driver distraction and may perform control for receiving the operation of the vehicle occupant relative to the non-driving operation system of which the operation has not been received, when the driving mode is the mode A of the automated driving. For example, the HMI controller 170 allows the display device 82 to display the video image, allows the speaker 83 to output the audio, and allows the content reproduction device 85 to reproduce the contents from the DVD, etc. Herein, in the contents to be reproduced by the content reproduction device 85 there may be included various kinds of contents concerning an amusement and an entertainment of the television program, etc. other than the contents stored in the DVD, etc., for example. Further, "the content reproduction operation" shown in FIG. 11 may designate the operation of the contents concerning such amusement and entertainment.

Further, HMI controller 170 controls the condition of the front window 90a on the basis of the degree of the automated driving (or the degree of the surroundings monitoring obligation) in each of the automated driving modes executed by the automated driving controller 120, so as to be either the visible condition or the visual difficulty condition. FIG. 12 is a diagram showing the condition of a front window 90a for each traveling mode. For example, in the case of the mode A in which the surroundings monitoring is not required, the HMI controller 170 changes at least the front window 90a into the frosted glass state thereby to opacify it, by using the dimming control device 92. In other words, the HMI controller 170 controls the front window 90a so as to be the visual difficulty condition. Then, the HMI controller 170 uses the opacified front window 90a as a screen, and projects and displays the images which are nothing to do with the front visual field, on the front window 90a by using the front display device 82a. The images which are nothing to do with the front visual field are the video images (images) etc. such as the contents, the television programs and the like reproduced by the content reproduction device 85, for example. Hereinafter, the images such as contents, the television programs and the like reproduced by the content reproduction device 85 are referred to as "entertainment image ET".

Figure 13:
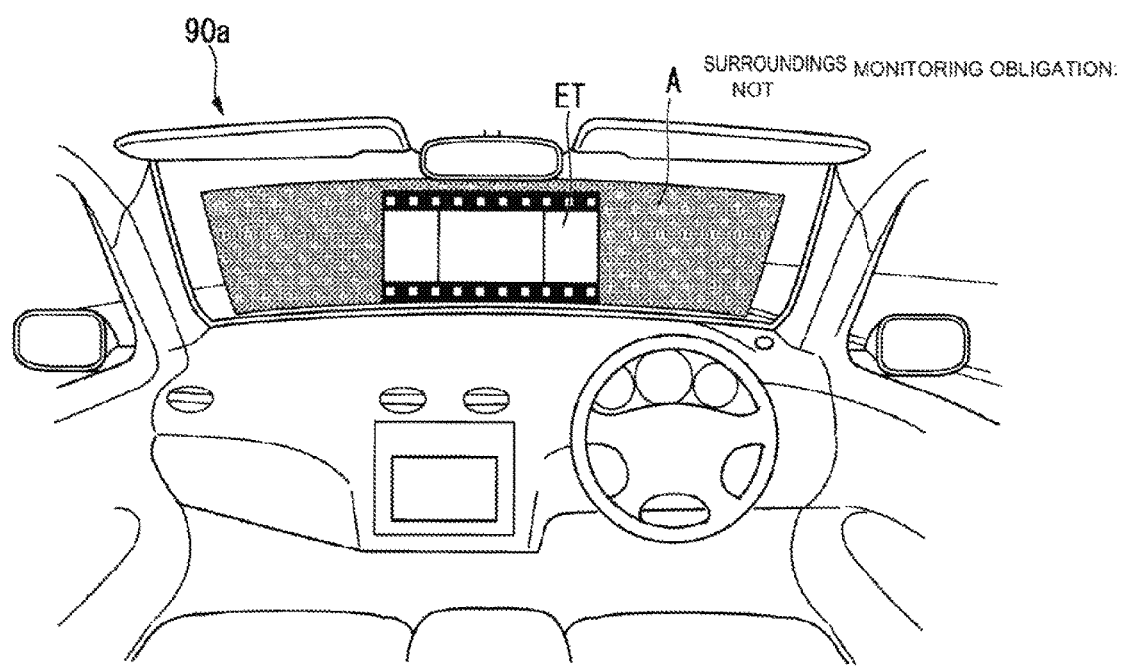
FIG. 13 is a diagram showing an example of a scene in which the condition of the front window 90a is the visual difficulty condition.

FIG. 13 is a diagram showing an example of a scene in which the condition of the front window 90a is the visual difficulty condition. In the scene as shown in the drawing, the HMI controller 170 projects the entertainment image ET on an opacified area ("A" in the drawing) of the front window 90a, for example. Herein, the HMI controller 170 may opacify the windshields 90 provided in each of the doors, the windshield (rear window) 90 provided on the rear side of the vehicle, the windshield 90 of the roof, etc. In this case, the HMI controller 170 may display the entertainment, image ET on these opacified windshields of various kinds.

Further, the HMI controller 170 may display the images including the information such as the route to the destination, the timing of the travel lane change, the existence of the peripheral vehicle around the own vehicle M and the condition of the peripheral vehicle recognized by the outside view recognition part 142, etc. as the images in relation to the front visual field, on the opacified front window 90a in the form of HUB. At that time, the HMI controller 170 may display various kinds of information on the whole area of the opacified front window 90a.

Further, as shown in FIG. 12, the HMI controller 170 makes the front window 90a transparent by using the dimming control device 92 so as to change the condition of the front window 90a into the visible condition in the case where the driving mode executed by the automated driving controller 120 is the mode B, the mode C and the manual driving mode in which the surroundings monitoring obligation is required.

Figure 14:
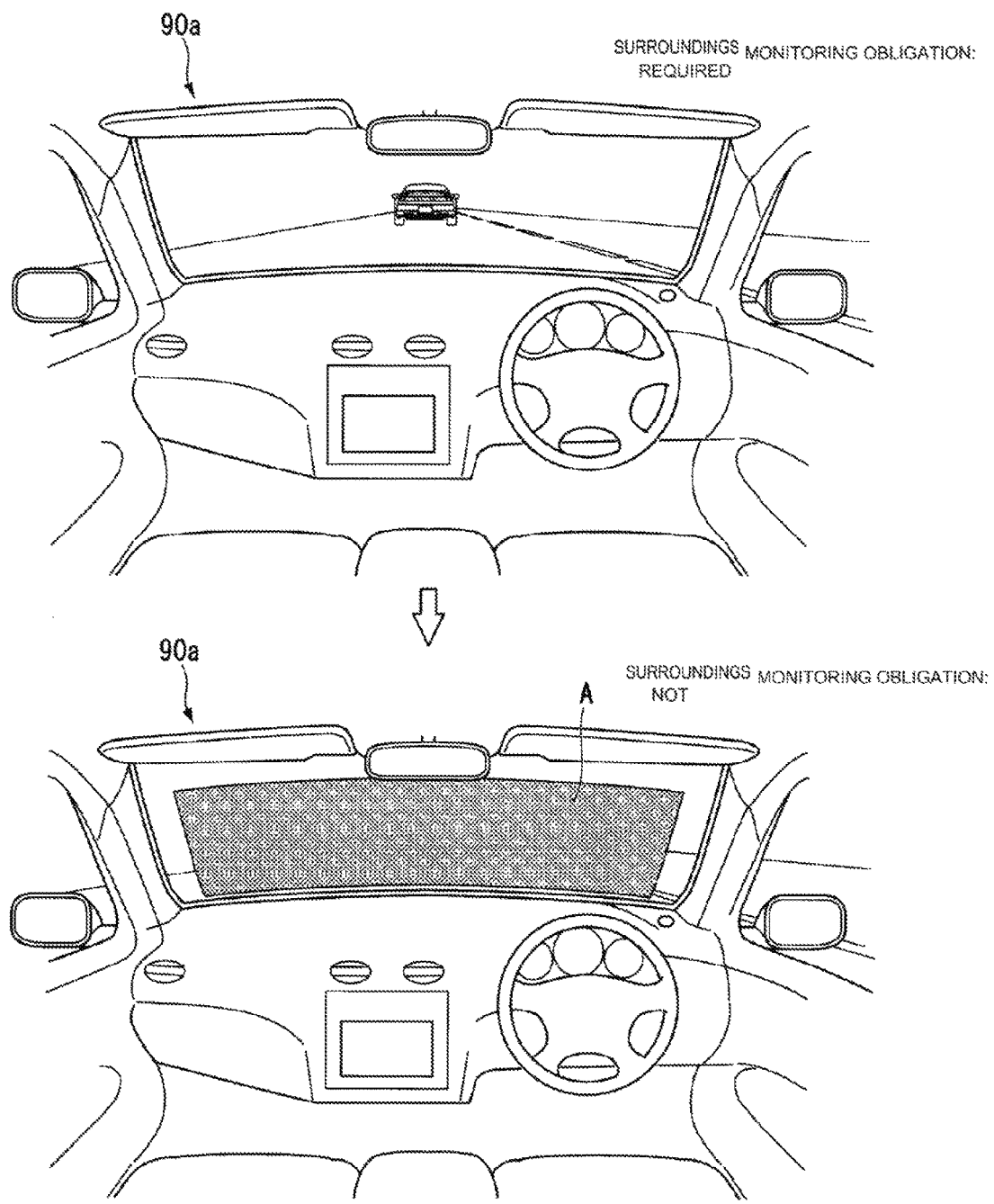
FIG. 14 is a diagram showing an example of a scene in which the condition of the front window 90a changes front a visible condition to the visual difficulty condition.

FIG. 14 is a diagram showing an example of a scene in which the condition of the front window 90a changes from a visible condition to the visual difficulty condition. As shown in the drawing, when the surroundings monitoring obligation arises, the HMI controller 170 makes the front window 90a transparent by using the dimming control device 92. On the other hand, in the case where the automated driving mode changes into the mode A and the surroundings monitoring obligation is not required, the HMI controller 170 opacifies the front window 90a by using the dimming control device 92. For example, the HMI controller 170 opacifies the area designated as a zone A of the front window 90a. The zone A is the area prescribed in the safety standards, etc. that the transparency of the front window 90a has to be ensured. The zone A is also referred to a test region A. In addition, the opacified area is not limited to the zone A, and may be the whole of the front window 90a or an area which is smaller than the zone A. Further, the opacified area may be offset to any of a right side, a left side, an upper side and a lower side from a center of the front window 90a. For example, the opacified area may be offset to the seat (driver's seat) side on which the steering wheel 78 is located. Thus, when the front window 90a is opacified, HMI controller 170 can make the interior of the vehicle the calm environment with low luminous intensity. As a result, it is possible to prevent the contrast of the image displayed on the front window 90a from being deteriorated and it is possible to heighten a relax effect, so that the vehicle occupant can view comfortably the entertainment images ET, etc. such as the movies, the television programs and the like. Herein, from a viewpoint of providing the calm environment of low luminous intensity, it is not necessarily required to display the entertainment image ET on the opacified front window 90a, and it maybe enough to only darken the interior of the vehicle.

Further, as shown in FIG. 12 referred to above, in the case where the mode in which the surroundings monitoring obligation is required is executed, the HMI controller 170 may display the HUD imaqe on a smaller display area than a display area of the HUD image which is displayed when the mode in which the surroundings monitoring obligation is not required is executed. Consequently, since the display area of the HUD image becomes smaller in the mode in which the surroundinqs monitoring obligation is required, the condition of the front window 90a is the visible condition, and since the display area of the HUD image becomes larger in the mode in which the surroundings monitoring obligation is not required, the condition of the front window is the visual difficulty condition.

Figure 15:
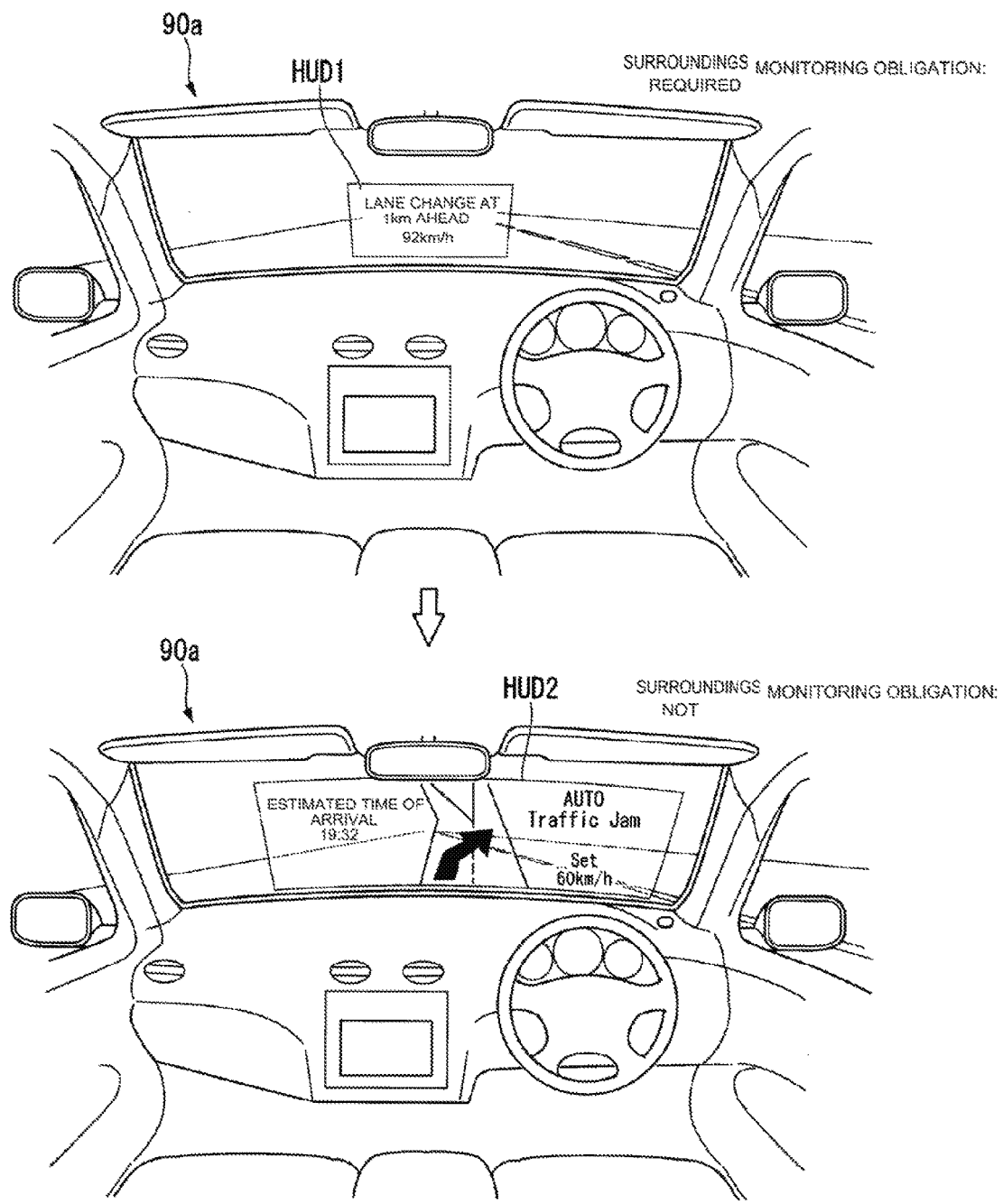
FIG. 15 is a diagram showing another example of the scene in which the condition of the front window 90a changes from the visible condition to the visual difficulty condition.

FIG. 15 is a diagram showing another example of the scene in which the condition of the front, window 90a changes from the visible condition to the visual difficulty condition. As shown in the drawing, in the case where the surroundings monitoring obligation arises, the HMI controller 170 displays an image HUD1 in the form of HUD on a partial area of the front window 90a by using the front, display device 82a, for example. On the other hand, in the case where the automated driving mode changes into the mode A so that the surroundings monitoring obligation is not required, the HMI controller 170 displays an image HUD2 in the form of HUD on a larger display area than the display area of the image HUD1 which is displayed when the surroundings monitoring obligation arises, by using the front, display device 82a. Consequently, when the surroundings monitoring obligation is not. required, the condition of the front window 90a is changed into the visual difficulty condition, and more information than the scene in which the surroundings monitoring obligation is required can be provided to the vehicle occupant.

Figure 16:
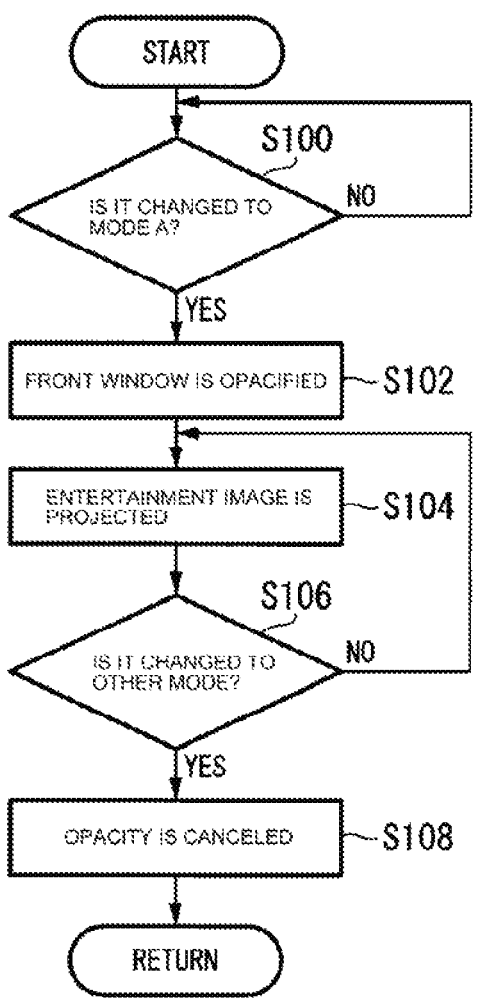
FIG. 16 is a flow chart showing an example of a flow of processing performed by an HMI controller 170 in accordance with a first embodiment.

FIG. 16 is a flow chart showing an example of a flow of processing performed by an HMI controller 170 in accordance with a first embodiment. First, the HMI controller 170 refers to the information obtained from the automated driving controller 120 and waits until the automated driving mode to be executed by the automated driving controller 120 changes into the mode A (Step S100), and when the automated driving mode changes into the mode A, it opacifies at least the front window 90a by using the dimming control device 92 (Step S102).

Next, the HMI controller 170 projects the entertainment image ET on the opacified area of the front, window 90a by using the front display device 82a (Step S104). Next, the HMI controller 170 refers to the information of the mode obtained from the automated driving controller 120 and judges whether or not the automated driving mode executed by the automated driving controller 120 changes from the mode A to other mode (mode B, mode C, manual driving mode, etc.) in which the surroundings monitoring obligation arises (Step S106).

When the automated driving mode changes from the mode A to other mode, the HMI controller 170 cancels the opacity of the front window 90a by using the dimming control device 92 (Step S108). On the other hand, when the automated driving mode does not change from the mode A to other mode, the HMI controller 170 returns the processing to the above step S104 and continues the projection of the entertainment image ET. Thus, the processing of this flow chart ends.

According to the above described first embodiment, since the condition of the front, window 90a corresponding to the front visual field of the vehicle is controlled so as to be either the visible condition or the visual difficulty condition based on the driving mode to be executed, the space corresponding to the front visual field of the driver can be utilized sufficiently.

<Second Embodiment>

The second embodiment will be explained hereunder. The second embodiment is different from the first embodiment in that, in view of the fact that it takes time to cancel the opacity of the front window 90a, the image imaged by the camera 40 (namely, the image which images the front side of the own vehicle M) is projected on the front window 90a during the process of changing the condition of the front window 90a from the opacity to the transparency. Hereinafter, such different point will be mainly explained.

The HMI control device 170 in the second embodiment projects and displays the image imaged by the camera 40 on the opacified front window 90a by using the front display device 82a when the condition of the front window 90a changes from the visual difficulty condition to the visible condition.

Figure 17:
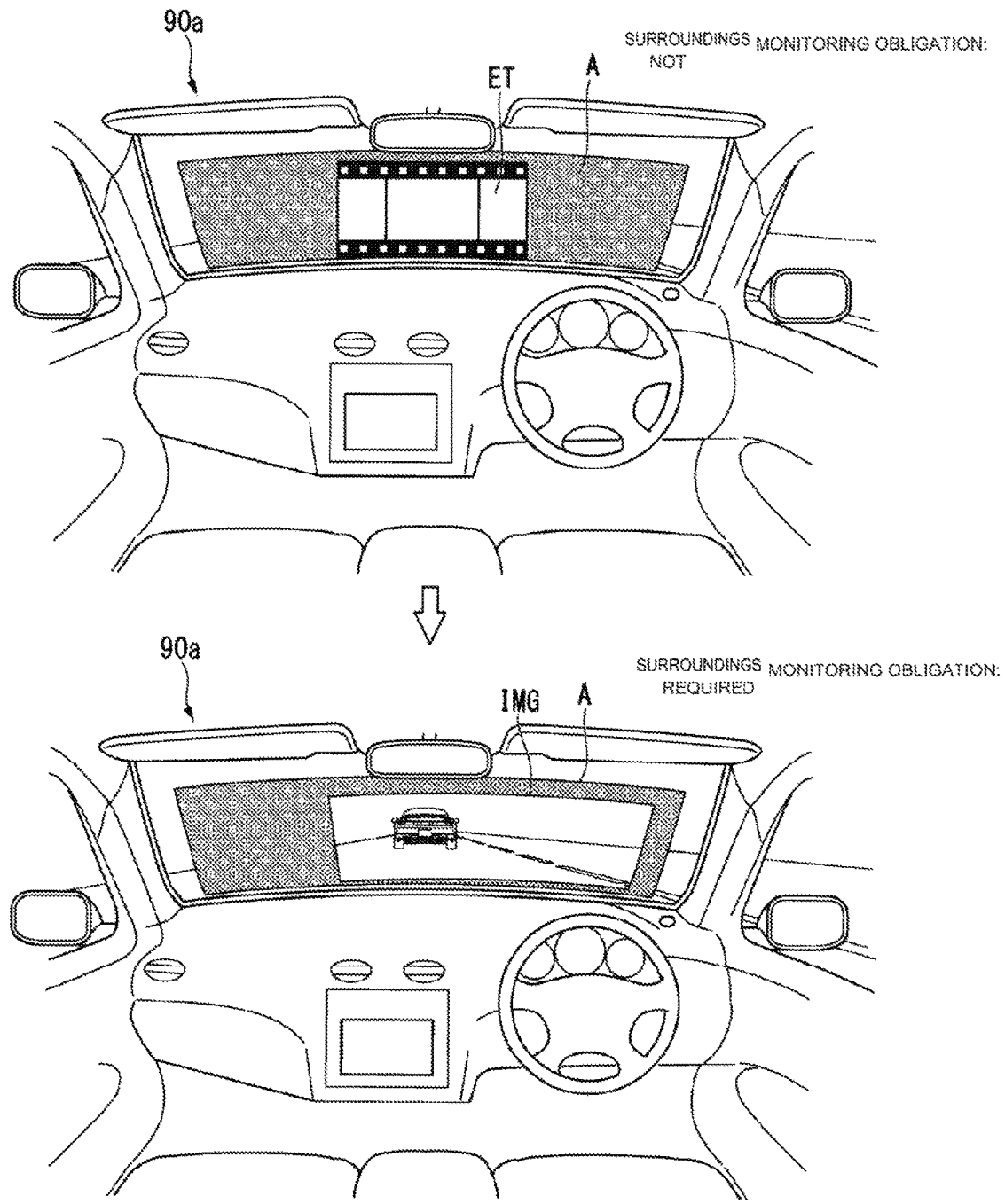
FIG. 17 is a diagram showing an example of a scene in which the condition of the front window 90a changes from the visual difficulty condition to the visible condition.

FIG. 17 is a diagram showing an example of a scene in which the condition of the front window 90a changes from the visual difficulty condition to the visible condition. For example, in the case where the zone A is opacified and the front window 90a is in the visual difficulty condition, the entertainment image ET such as the movie and the like is projected on the front window 90a. In this condition, for example, in the case where the change of the automated driving mode occurs and the surroundings monitoring obligation is caused, the HMI controller 170 makes the front window 90a transparent so as to change it into the visible condition by using the dimming control device 92. For example, it is assumed that at the time of changing from the opacified condition to the transparency, the orientation of the liquid crystal particles of the interior of the front window 90a does not become even and the opacity of the partial area is not cancelled. In addition, it is assumed that the opacity is not cancelled due to the control error, etc. of the dimming control device 92. Further, it is also assumed that it take time until the orientation of the liquid crystal particles becomes even and the delay is caused until the opacity is cancelled. In the case where the surroundings monitoring cannot be performed due to such factors of various kinds and on the assumption that the start of the surroundings monitoring is delayed, the HMI controller 170 projects the image IMG imaged by the camera 40 on the opacified zone A by using the front display device 82a at the time the condition of the front window 90a changes from the visual difficulty condition to the visible condition. Consequently, it is possible to allow the vehicle occupant to perform rapidly the surroundings monitoring through the image IMG of the camera 40. Herein, the image IMG of the camera 40 may be a time-series image, namely, a motion video.

Figure 18:
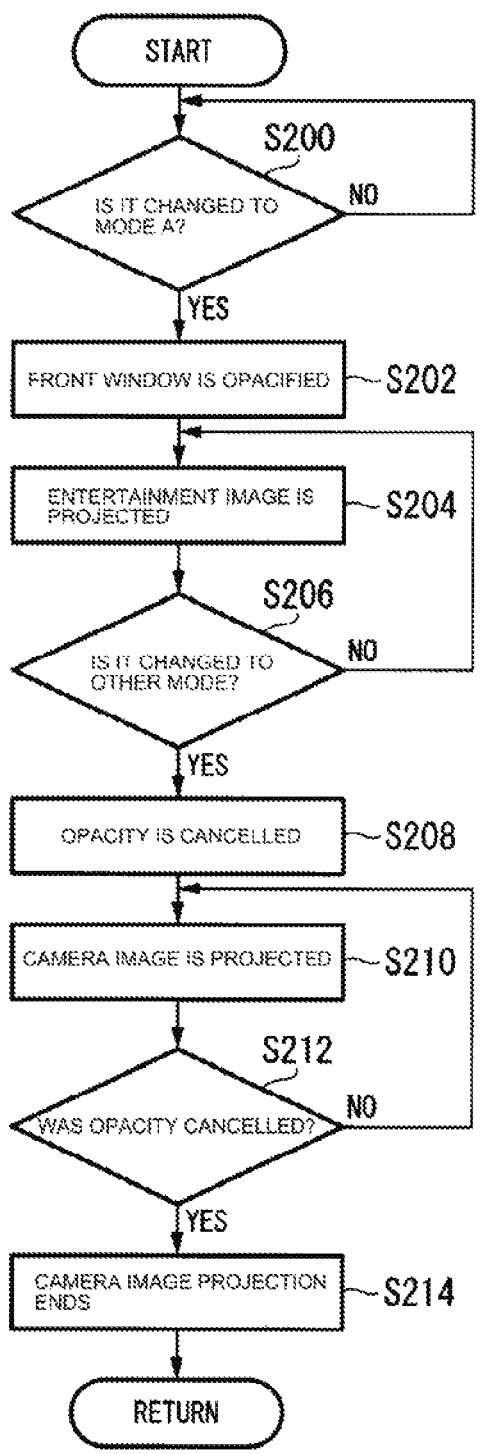
FIG. 18 is a flow chart showing an example of a flow of processing performed by the HMI controller 170 in accordance with a second embodiment.

FIG. 18 is a flow chart showing an example of a flow of processing performed by the HMI controller 170 in accordance with a second embodiment. The processing from S200 to S206 shown in this flow chart is similar to the processing from S100 to S106 as shown in FIG. 16, so that the explanation will be omitted.

When the automated driving mode changes from the mode A to other mode, the HMI controller 170 starts to cancel the opacity of the front window 90a by using the dimming control device 92 (Step S208).

Next, the HMI controller 170 projects the image of the camera 40 on the opacity cancelled front window 90a by using the front display device 82a (Step S210). Next, the HMI controller 170 judges whether or not the opacity of the front window 90a has been cancelled (Step S212). When the opacity of the front window 90a is not cancelled, the image of the camera 40 continues to be projected until the opacity of the front window 90a is cancelled, and when the opacity of the front window 90a has been cancelled, the projection of the image of the camera 40 ends (Step S214). In other words, the HMI controller 170 continues to display the image of the camera 40 on the front window 90a during the process of changing the condition of the front window 90a from the visual difficulty condition to the visible condition. Thus, the processing of this flow chart ends.

According to the above described second embodiment, as with the first embodiment as referred to above, the space corresponding to the front visual field of the driver can be utilized sufficiently.

Further, according to the second embodiment, since the image IMG of the camera 40 is displayed on the front window 90a in the process of changing the condition of the front window 90a corresponding to the front visual field of the vehicle from the visual difficulty condition to the visible condition, the vehicle occupant can perform the surroundings monitoring rapidly through the image IMG of the camera 40.

<Third Embodiment>

The third embodiment will be explained hereunder. The third embodiment is different from the first embodiment in that the vehicle equipped with the vehicle control system 100 is provided with the front window 90b which screens the front visual field of the vehicle occupant all the time, instead of the front window 90a. Hereinafter, such different point will be mainly explained.

The front window 90b is formed of, for example, materials, etc. through which a visual light is not transmitted. To be concrete, the front window 90b is formed of materials such as aluminum alloy, steel, FRP (Fiber Reinforced Plastics), CFRP (Carbon Fiber Reinforced plastics) and the like. These materials, generally, are high in rigidity as compared with transparent materials such as glass and the like, so that it is possible to prevent the vehicle occupant, from being thrown out of the vehicle and to prevent an obstacle from flying into the interior of the vehicle. Further, as compared with the transparent materials such as the glass and the like, the safety precaution equipment such as various kinds of electronic equipment, an air bag device and the like are easily mounted. Therefore, it is possible to improve the safety of the vehicle occupant and to enhance the electronic equipment of the vehicle. Further, since the front window 90b screens the visual light coming from the front of the vehicle, the interior of the vehicle is darkened so that the calm environment of low luminous intensity can be provided. As a result, the vehicle occupant can view comfortably the entertainment images ET, the HUD image, etc. such as the movies. The windshield 90 provided in each of the doors and the windshield 90 (rear window) located in the rear of the vehicle may be formed of the materials which continuously screen the visual field from the interior of the vehicle.

On the other hand, the vehicle occupant is not able to recognize the outside conditions of the vehicle through at least the front window 90b (or difficult to recognize it). Therefore, the HMI controller 170 projects the image IMG of the camera 40 on the front window 90b by using the front display device 82a when the mode which requires the surroundings monitoring is executed by the automated driving controller 120.

Figure 20:
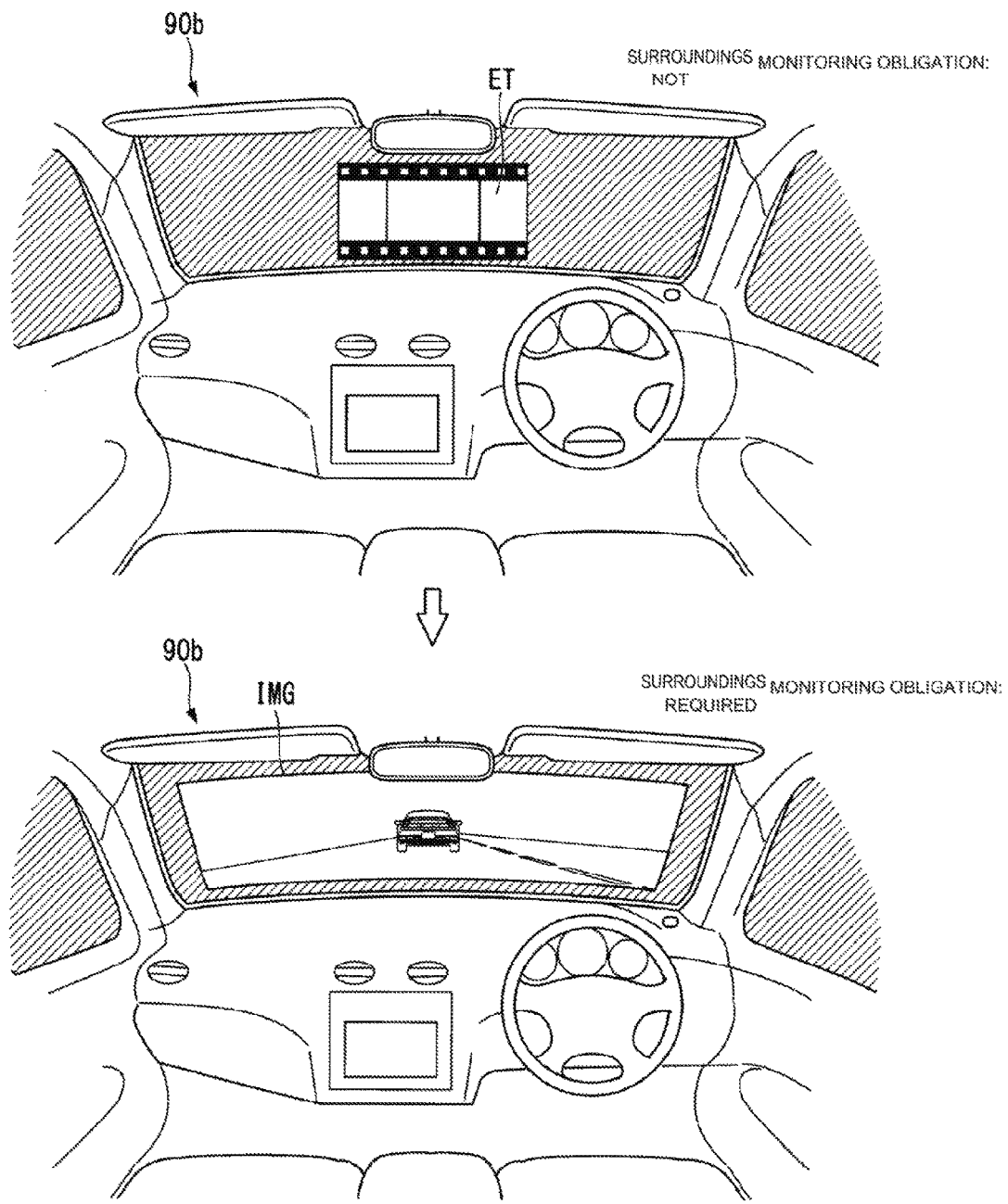
FIG. 20 is a diagram showing an example of an image projected on the front window 90b.

FIG. 19 is a diagram showing the condition of a front window 90b for each traveling mode. In addition, FIG. 20 is a diagram showing an example of the image which is projected on the front window 90b. As shown in FIG. 19, the front window 90b is not transparent without regard to the necessity of the surroundings monitoring obligation and is the visual difficulty condition with respect to every mode. In the case of executing the mode A in which the surroundings monitoring obligation does not arise, as shown in FIG. 20, the HMI controller 170 projects and displays the entertainment image ET on the front window 90b by using the front display device 82a. Further, in the case of executing the mode B and the like in which the surroundings monitoring obligation arises, the HMI controller 170 projects and displays the image IMG of the camera 40 on the front window 90b by using the front display device 82a. Consequently, the HMI controller 170 changes the front window 90b into the visible condition.

Further, on a surface of the above mentioned front window 90b located on the interior of the vehicle there may be provided the LED, an organic EL display device and the like. In this case, the HMI controller 170 may display the entertainment image ET and the image IMG of the camera 40 on the various kinds of display devices of the front window 90b.

According to the above described third embodiment, as with the above referred first and second embodiments, since the condition of the front window 90b corresponding to the front visual field of the vehicle is controlled so as to be either the visible condition or the visual difficulty condition based on the executing traveling mode, the space corresponding to the front visual field of the driver can be utilized sufficiently.

While the several aspects the present application is explained by using the embodiments, it is to be understood that the present invention is not limited to the specific embodiments and that various changes and substitutions may be made in the invention without departing from the spirit and scope thereof. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.
Automated drivingAutomated driving

The invention claimed is:

1. A vehicle control system comprising:
   a windshield provided on a front side of a vehicle;
   a camera for imaging a front of the vehicle;
   a display controller for displaying an image captured by the camera on the windshield;
   an automated driving controller for executing any of a plurality of driving modes which include an automated driving mode for automatically performing at least one of speed control and steering control of the vehicle and a manual driving mode for performing both of the speed control and the steering control based on operation of an occupant of the vehicle; and
   a visual field condition controller for controlling a front visual field condition of the vehicle in accordance with the driving mode executed by the automated driving controller such that the front visual field condition is in either a visible condition or a visual difficulty condition, the visual difficulty condition having lower visibility than the visible condition,
   wherein when the front visual field condition of the vehicle is switched from the visual difficulty condition to the visible condition through transition time between the visual difficulty condition to the visible condition, the visual field condition controller displays the image captured by the camera on the windshield by using the display controller during the transition time.

2. A vehicle control system according to claim 1, wherein the visual field condition controller controls the front visual field condition of the vehicle to be the visual difficulty condition when the automated driving mode is executed by the automated driving controller, and controls the front visual field condition of the vehicle to be the visible condition when the manual driving mode is executed by the automated driving controller.

3. A vehicle control system according to claim 1, wherein the automated driving mode includes a plurality of modes which are different in degree of vehicle surroundings monitoring obligation imposed on the occupant of the vehicle from each other, and the visual field condition controller controls the front visual field condition of the vehicle, in accordance with the degree of the surroundings monitoring obligation of the automated driving mode executed by the automated driving controller, so as to be either the visible condition or the visual difficulty condition.

4. A vehicle control system according to claim 3, wherein the plurality of modes includes a mode in which the surroundings monitoring obligation of the vehicle is not imposed, and the visual field condition controller controls the front visual field condition of the vehicle to be the visual difficulty condition when the mode in which the surroundings monitoring obligation of the vehicle is not imposed is executed by the automated driving controller.

5. A vehicle control system according to claim 4, wherein the visual field condition controller controls the front visual field condition of the vehicle to be the visual difficulty condition by opacifying the windshield when the mode in which the surroundings monitoring obligation of the vehicle is not imposed is executed by the automated driving controller.

6. A vehicle control system according to claim 5, wherein the display controller displays a predetermined image on the opacified windshield.

7. A vehicle control system according to claim 4, further comprising a windshield provided on a front side of the vehicle, wherein the visual field condition controller controls the front visual field condition of the vehicle by adjusting a transparency of the windshield.

8. A vehicle control system according to claim 1, further comprising a display device for displaying an image which has nothing to do with the front visual field of the vehicle, on a windshield provided on the front side of the vehicle, when the front visual field condition of the vehicle is controlled by the visual field condition controller to be the visual difficulty condition.

9. A vehicle control system according to claim 1, wherein the visual field condition controller displays the image captured by the camera on the windshield by using the display controller throughout the transition time.

10. A vehicle control system according to claim 1, further comprising:
    a second windshield provided on a rear side of the vehicle; and
    a third windshield provided on an upper side of the vehicle,
    wherein the visual field condition controller controls a rear visual field condition through the second windshield or an upper visual field condition through the third windshield in accordance with the driving mode executed by the automated driving controller such that the rear visual field condition is in either the visible condition or the visual difficulty condition, or the upper visual field condition is in either the visible condition or the visual difficulty condition.

11. A vehicle control system comprising:
    a windshield provided in the front side of a vehicle, the windshield always blocking visual light from outside to inside of the vehicle, and
    a camera for imaging a front of the vehicle;
    a display controller for displaying an image captured by the camera on the windshield;
    an automated driving controller for executing any of a plurality of driving modes which include an automated driving mode for automatically performing at least one of speed control and steering control of the vehicle and a manual driving mode for performing both of the speed control and the steering control based on operation of an occupant of the vehicle; and
    a visual field condition controller for controlling a front visual field condition of the vehicle in accordance with the driving mode executed by the automated driving controller such that the front visual field condition is in either a visible condition or a visual difficulty condition, the visual difficulty condition having lower visibility than the visible condition,
    wherein the visual field condition controller controls the front visual field condition of the vehicle from the visual difficulty condition to the visible condition by displaying on the windshield the image captured by the camera by using the display controller.

12. A vehicle control system according to claim 11, wherein the windshield is made of material through which the visual light is not transmitted.

13. A vehicle control method implemented by an on-vehicle computer equipped on a vehicle, comprising steps of:
- (i) executing any of a plurality of driving modes which include an automated driving mode for automatically performing at least one of speed control and steering control of a vehicle and a manual driving mode for performing both of the speed control and the steering control based on operation of an occupant of the vehicle; and
- (ii) controlling a front visual field condition of the vehicle in accordance with the executed driving mode such that the front visual field condition is in either a visible condition or a visual difficulty condition, the visual difficulty condition having lower visibility than the visible condition, wherein the vehicle comprises:
a windshield provided on a front side of a vehicle;
a camera for imaging a front of the vehicle; and
a display controller for displaying an image captured by the camera on the windshield,
wherein when the front visual field condition of the vehicle is switched from the visual difficulty condition to the visible condition through transition time between the visual difficulty condition to the visible condition, the step (ii) displays the image captured by the camera on the windshield by using the display controller during the transition time.

14. A non-transitory computer readable medium storing a vehicle control program which causes an on-board computer equipped on a vehicle to:
execute any of a plurality of driving modes which include an automated driving mode for automatically performing at least one of speed control and steering control of a vehicle and a manual driving mode for performing both of the speed control and the steering control based on operation of an occupant of the vehicle; and
control a front visual field condition of the vehicle in accordance with the executed driving mode such that the front visual field condition is in either a visible condition or a visual difficulty condition, the visual difficulty condition having lower visibility than the visible condition,
wherein the vehicle comprises:
a windshield provided on a front side of a vehicle;
a camera for imaging a front of the vehicle; and
a display controller for displaying an image captured by the camera on the windshield,
wherein when the front visual field condition of the vehicle is switched from the visual difficulty condition to the visible condition through transition time between the visual difficulty condition to the visible condition, the on-board computer displays the image captured by the camera on the windshield by using the display controller during the transition time.

* * * * *